US010337851B2

(12) United States Patent
Girshovitz et al.

(10) Patent No.: US 10,337,851 B2
(45) Date of Patent: Jul. 2, 2019

(54) FAST PHASE PROCESSING OF OFF-AXIS INTERFEROGRAMS

(71) Applicant: Ramot at Tel-Aviv University Ltd., Tel Aviv (IL)

(72) Inventors: Pinhas Girshovitz, Beer Sheva (IL); Natan Tzvi Shaked, Rishon Lezion (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 392 days.

(21) Appl. No.: 15/089,691

(22) Filed: Apr. 4, 2016

(65) Prior Publication Data
US 2016/0290782 A1    Oct. 6, 2016

Related U.S. Application Data

(60) Provisional application No. 62/142,162, filed on Apr. 2, 2015.

(51) Int. Cl.
| | | |
|---|---|---|
| *G06K 9/36* | (2006.01) | |
| *G01B 9/021* | (2006.01) | |
| *G01B 11/06* | (2006.01) | |
| *G01B 11/24* | (2006.01) | |

(52) U.S. Cl.
CPC .......... *G01B 9/021* (2013.01); *G01B 11/0675* (2013.01); *G01B 11/2441* (2013.01)

(58) Field of Classification Search
None
See application file for complete search history.

(56) References Cited

U.S. PATENT DOCUMENTS

| | | | | | |
|---|---|---|---|---|---|
| 4,383,734 A | * | 5/1983 | Huignard | ................ | G06E 3/005 359/561 |
| 4,449,193 A | * | 5/1984 | Tournois | .............. | G06G 7/1928 382/278 |
| 4,588,260 A | * | 5/1986 | Horner | ................... | G06K 9/745 359/29 |
| 4,695,973 A | * | 9/1987 | Yu | .......................... | G06E 3/005 359/561 |

(Continued)

OTHER PUBLICATIONS

A new technique for noise filtering of SAR Interferometric phase images, Jong-Sen Lee et al, IEEE, 0196-2892, 1998, pp. 1456-1465 (Year: 1998).*

(Continued)

*Primary Examiner* — Jayesh A Patel
(74) *Attorney, Agent, or Firm* — Browdy and Neimark, PLLC

(57) ABSTRACT

Techniques for extracting phase data of off-axis interferogram images are disclosed. At least one sample-related interferogram image associated with a sample is spectrally decomposed to obtain a set of frequency components thereof, and a portion of the set of frequency components is used to generate at least one complex image having a reduced size being smaller in size than the sample-related interferogram image and being indicative of the phase data of the at least one sample-related interferogram image. The reduced size complex image is then used to generate a phase image of the least one sample-related interferogram image.

38 Claims, 16 Drawing Sheets
(2 of 16 Drawing Sheet(s) Filed in Color)

(56) References Cited

U.S. PATENT DOCUMENTS

| | | | | |
|---|---|---|---|---|
| 4,765,714 | A * | 8/1988 | Horner | G02B 27/46 359/561 |
| 5,491,551 | A * | 2/1996 | Mattson | G01J 3/453 250/237 G |
| 5,726,656 | A * | 3/1998 | Frankot | G01S 7/4004 342/156 |
| 5,923,278 | A * | 7/1999 | Poehler | G01S 13/9023 342/191 |
| 6,011,625 | A * | 1/2000 | Glass | G01S 13/9023 342/25 C |
| 6,421,163 | B1 * | 7/2002 | Culver | G02B 27/46 359/237 |
| 6,538,791 | B2 * | 3/2003 | Trezza | G06E 3/003 356/457 |
| 7,457,721 | B2 * | 11/2008 | Takeda | G01B 11/002 356/300 |
| 2004/0145745 | A1 * | 7/2004 | Voelkl | G01B 9/021 356/458 |
| 2006/0209370 | A1 * | 9/2006 | Coppola | G03H 1/0866 359/9 |
| 2006/0256343 | A1 * | 11/2006 | Choma | A61B 5/0066 356/450 |
| 2006/0291712 | A1 * | 12/2006 | Popescu | G01N 15/1475 382/134 |
| 2008/0234982 | A1 * | 9/2008 | Allen | G06T 5/50 702/190 |
| 2012/0294136 | A1 * | 11/2012 | Sato | G03H 1/0443 369/112.15 |

OTHER PUBLICATIONS

Pham, H., et al. "Off-axis quantitative phase imaging processing using CUDA: toward real-time applications", Biomed. Opt. Express, 2(7): 1781-1793 (2011).

Girshovitz, P. et al "Real-time quantitative phase reconstruction in off-axis digital holography using multiplexing", Opt. Lett, 39(8): 2262-2265 (2014).

Debnath S. K. et al "Real-time quantitative phase imaging with a spatial phase-shifting algorithm", Opt. Lett., 36(23): 4677-4679. (2011).

Bhaduri, B. et al "Derivative method for phase retrieval in off-axis quantitative phase imaging", Opt. Lett., 37(11): 1868-1870 (2012).

Xu, Y., et al. "A new method of phase derivative extracting for off-axis quantitative phase imaging", Opt. Communications 305: 13-16 ( 2013).

Sha, B., et al. "Fast reconstruction of off-axis digital holograms based on digital spatial multiplexing", Opt. Express 22 (19): 23066-23072 (2014).

Herraez, M. A., et al. "Fast two-dimensional phase-unwrapping algorithm based on sorting by reliability following a noncontinuous path", App. Opt., 41(35): 7437-7444 (2002).

* cited by examiner

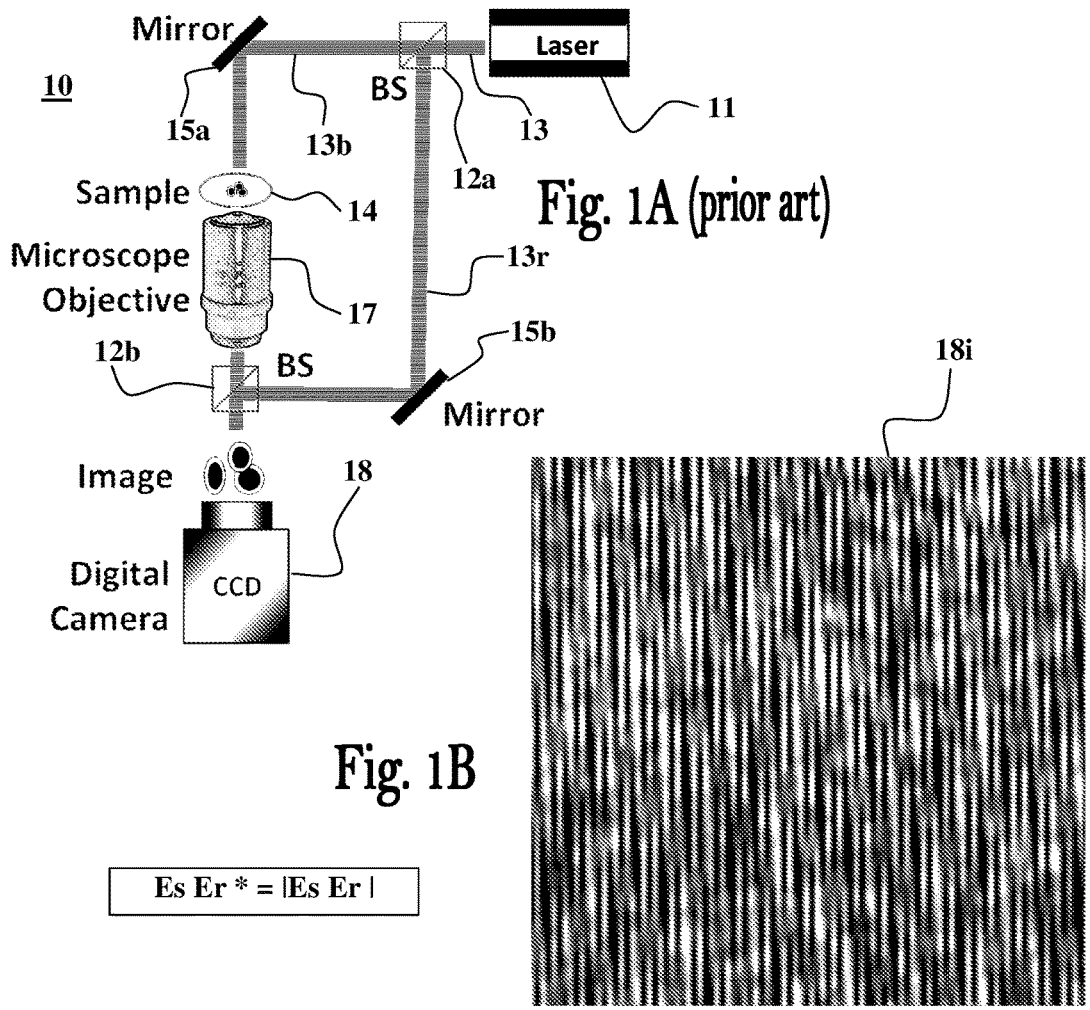
Fig. 1A (prior art)
Fig. 1B
$E_s E_r * = |E_s E_r|$
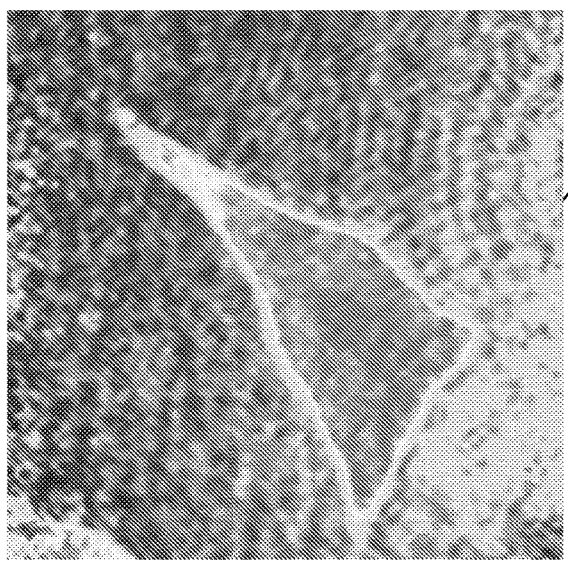
Fig. 1C

FAST PHASE PROCESSING OF OFF-AXIS INTERFEROGRAMS

TECHNOLOGICAL FIELD

The present invention is generally in the field of off-axis interferometry.

BACKGROUND ART

References considered to be relevant as background to the presently disclosed subject matter are listed below:
- H. Pham, H. Ding, N. Sobh, M. Do, S. Patel, and G. Popescu, "Off-axis quantitative phase imaging processing using CUDA: toward real-time applications," Biomed. Opt. Express 2(7), 1781-1793 (2011).
- P. Girshovitz and N. T. Shaked, "Real-time quantitative phase reconstruction in off-axis digital holography using multiplexing," Opt. Lett. 39(8), 2262-2265 (2014).
- S. K. Debnath and Y. K. Park, "Real-time quantitative phase imaging with a spatial phase-shifting algorithm," Opt. Lett. 36(23), 4677-4679 (2011).
- B. Bhaduri and G. Popescu, "Derivative method for phase retrieval in off-axis quantitative phase imaging," Opt. Lett. 37(11), 1868-1870 (2012).
- Y. Xu, Y. Wang, W. Jin, C. Lv, and H. Wu, "A new method of phase derivative extracting for off-axis quantitative phase imaging," Opt. Communications 305, 13-16 (2013).
- B. Sha, X. Liu, X. L. Ge and C. S. Guo, "Fast reconstruction of off-axis digital holograms based on digital spatial multiplexing," Opt. Express 22(19), 23066-23072 (2014).
- M. A. Herráez, D. R. Burton, M. J. Lalor, and M. A. Gdeisat, "Fast two-dimensional phase-unwrapping algorithm based on sorting by reliability following a noncontinuous path," App. Opt. 41(35), 7437-7444 (2002).

Acknowledgement of the above references herein is not to be inferred as meaning that these are in any way relevant to the patentability of the presently disclosed subject matter.

BACKGROUND

An off-axis interferogram is a photographic record of off-axis light interference patterns between two propagating waves produced using an interferometer. Off-axis digital holography is an imaging method for capturing the complex wave-front (amplitude and phase) of an imaged object by encoding it into an interference pattern acquired by a digital camera. The ability to capture the complex wave-front has made digital holography attractive in many fields, including label-free imaging for biological applications and nondestructive testing in metrology.

Off-axis interference in digital holography enables wave-front acquisition at the camera frame rate, without multiple frames per each sample instance, making it suitable for dynamic imaging. For microscopic samples the recording is done using interferometric phase microscopy (IPM) setups capable of recording both the intensity of the object emitted light and the delay of light caused by the object. These techniques provide a unique and powerful tool for biological research, medical diagnosis, and in metrology (e.g., characterizing micro and/or nano structures).

However, the extraction of the recorded sample wave-front is computationally intense, and thus it is usually done offline. This digital extraction process typically includes spatial filtering by two two-dimensional (2D) Fourier transforms, and a 2D phase unwrapping process for solving ambiguities in the phase map of the sample, which yields the unwrapped phase map. Typically, when using a conventional computer and utilizing a single processing core, this full digital process (spatial filtering and phase unwrapping) can take half a second for one megapixel holograms, which precludes video-frame processing and visualization. This reconstruction process is slow due to the high number of operations required to extract one wave-front, due to the use of two 2D Fourier transforms, and due to the phase unwrapping process that scans the image for $2\pi$ ambiguities.

For example, the reconstruction of quantitative phase profiles of dynamic microscopic samples captured using digital off-axis interferometry typically involves off-line post-processing. The processing speed for extracting the unwrapped quantitative phase profile from the captured interferograms is performed in approximately two frames-per-second (fps) for 1 megapixel interferograms on a conventional computer, which does not suit many real-time applications including real time visualization of the imaged sample.

One approach to overcome the slow reconstruction process of digital off-axis interferograms is the use of stronger processing units employing multi-core processors (CPUs). For example, to enable inline processing of off-axis holograms, one can use a graphic processing unit (GPU) of a computer that can divide the overall calculation to smaller calculations performed on one of the GPU multiple internal processors in parallel, while speeding up the total calculation time. However, GPU processing requires special programming skills, does not work on all types of computers, and does not decrease the inherent computational complexity of the algorithms.

Another possible solution is the use of faster unwrapping algorithms, restrictive algorithms, spatial phase shifting algorithm, derivative algorithms, and/or using significantly different wave-front extraction algorithms that can be performed with reduced computational efforts. However, these algorithms typically induce certain limitations on the samples that can be quantitatively imaged.

GENERAL DESCRIPTION

The present invention provides techniques for fast extraction of quantitative phase profiles from off-axis interferograms. The processing techniques used nowadays require substantially high computational efforts mostly due to the 2D Fourier transforms and the 2D phase unwrapping stages of the process, resulting in slow frame rates (approximately two fps for one megapixel interferogram\hologram on a conventional PC). Due to these limitations the extraction of phase profiles of off-axis interferograms is typically carried out nowadays only off-line in slow rates, particularly when carried out with standard desktop computers.

The present invention provides novel processing techniques for extracting phase profiles of off-axis interferograms (or holograms) that are capable of reaching substantially higher processing rates (e.g., up to 45 fps for one megapixel off-axis interferograms/holograms with phase unwrapping, and up to 150 fps if phase unwrapping is not required). The new processing techniques of the present invention allow exploiting the full potential of off-axis holography and interferometry for real-time thickness profiling. Accordingly, these novel techniques may be advantageously used in industry and clinical/laboratory implementations, using their conventional computer resources e.g., for metrology, wafer and electronic inspection, and biomedical imaging, by providing real time information about the sample.

The present invention can be used to improve the conventional off-axis holographic processing methods, based on 2D Fourier transforms and 2D phase unwrapping, for reaching video frame rates, while utilizing only a single-core processing unit of a standard personal computer (PC). In some embodiments the processing techniques of the present invention are capable of reaching unwrapped-phase-map processing frame rates of up to 32 fps for one megapixel off-axis interferograms/holograms. This is done by significantly decreasing the number of pixels used in the phase unwrapping step, and by improving the efficiency of the Fourier transforms by decreasing the number of calculations performed per processed interferogram.

In some embodiments a digital multiplexing/summation unit is utilized to produce a multiplexed/superimposed interferogram from two off-axis interferograms having orthogonal fringe directions into one interferogram, and a single Fourier transform unit is used to process the produced multiplexed interferogram. In some possible embodiments a digital multiplexing unit is used to produce a single multiplexed interferogram from four off-axis interferograms, and a single Fourier transform unit is used to process the multiplexed interferogram under the assumption of a uniaxial fringe direction.

Accordingly, in one aspect there is provided a method of extracting phase data from off-axis interferogram images comprising receiving at least one interferogram image having a predefined size and performing spectral decomposition thereto to obtain a set of frequency components thereof, and using a portion of said set of frequency components to reconstruct an image being indicative at least of said phase data (and possibly also of amplitude data of the interferogram image). The portion of the frequency components used for the image reconstructions is being indicative of cross-correlation of an interference pattern in the interferogram image. The reconstructed image obtained is thus substantially smaller than the predefined size of the interferogram image. In some embodiments the method may comprise enlarging the size of the reconstructed image to provide an enlarged reconstructed image which size substantially equals to the predefined size of the interferogram image. Optionally, and in some embodiments preferably, empty spatial-frequency domain areas of the spectral decomposition are used for processing cross-correlation terms of other interferogram images and generating their respective reconstructed images.

In one aspect there is provided a computer-implemented method of extracting phase data of off-axis interferogram images, the method comprising: (i) receiving at least one sample-related interferogram image associated with a sample; (ii) performing spectral decomposition to the at least one sample-related interferogram image to obtain a set of frequency components thereof; (iii) generating from a portion of the set of frequency components at least one complex image having a reduced size being smaller in size than the sample-related interferogram image (e.g., 1/16 of the size of the interferogram image) and being indicative of the phase data i.e., obtained without zero padding; and (iv) using the reduced size complex image to generate a phase image of the least one sample-related interferogram image. The portion of the frequency components used to generate the complex image is indicative of cross-correlation of an interference pattern in the interferogram image.

Optionally, and in some embodiments preferably, performing of the spectral decomposition comprises performing a single Fourier transform operation to obtain the frequency components, and generating the at least one complex image comprises performing one or more inverse Fourier transform operations.

The method can further comprise providing a sample-free instance of the interferogram image, performing steps (ii) and (iii) on the sample-free instance image to obtain a reference image indicative of the cross-correlation of the interference pattern, a size of the reference image being smaller than a size of the sample-free instance image, and using the reference image to compensate for stationary aberrations and curvatures in the at least one complex image.

The method can further comprise enlarging the size of the phase image to provide an enlarged image which size substantially equals to the size of the interferogram image.

In some embodiment, the method comprises asymmetric re-sampling of the at least one interferogram image along an image plane axis so as to reduce size of the interferogram image along the image plane axis, where the image plane axis substantially coincides with direction of fringes of the at least one interferogram image.

Optionally, and in some embodiments preferably, the method is adapted to utilize empty spatial-frequency domain areas of the spectral decomposition used in step (ii) for processing at least one additional sample-related interferogram image and generating a respective at least one additional complex image therefrom indicative of phase data of the at least one additional interferogram image. Advantageously, the spectral decomposition used in step (ii) comprises performing a single Fourier transform operation to obtain the frequency components.

This is achieved in some embodiments by generating the sample-related interferogram image by summating a first sample-related interferogram image and a transpose of a second sample-related interferogram image. In this case the generating of the at least one complex image comprises selecting a first spatial-frequency portion of the frequency components and generating therefrom a first complex image being indicative of phase data of the first sample-related interferogram image, and selecting a second spatial-frequency portion of the frequency components and generating therefrom a second complex image being indicative of phase data of the second sample-related interferogram image. In some embodiments, the method comprises asymmetric re-sampling of the first and second sample-related interferogram images along an image plane axis, before summating the images, so as to reduce sizes of the sample-related interferogram images along the image plane axis, the image plane axis substantially coincides with direction of fringes of the sample-related interferogram images.

Alternatively, the method comprises generating the sample-related interferogram image as a complex interferogram image constructed from first and second sample-related interferogram images used as real and imaginary parts thereof, respectively. In this case the generating of the at least one complex image comprises selecting first and second spatial-frequency portions of the frequency components, generating from a first linear combination of the first and second spatial-frequency portions a first complex image being indicative of phase data of the first sample-related interferogram image and from a second linear combination of the first and second spatial-frequency portions a second complex image being indicative of phase data of the second sample-related interferogram image, the first and second linear combinations comprise a transposition of one of the first and second spatial-frequency portions. In some embodiments the method comprises asymmetric re-sampling of the first and second sample-related interferogram images along an image plane axis, before constructing the complex interferogram image, so as to reduce sizes of the sample-related interferogram images along the image plane axis, the image plane axis substantially coincides with direction of fringes of the sample-related interferogram images. Optionally, the first and second spatial-frequency portions are associates with a common image plane axis.

Alternatively, the method comprises generating the sample-related interferogram image as a complex image constructed from first and second summations of sample-related interferogram images used as its real and imaginary part, respectively, the first summation comprises a first sample-related interferogram image summated with a transpose of a second sample-related interferogram image and the second summation comprises a third sample-related interferogram image summated with a transpose of a fourth sample-related interferogram image. In this case, the generating of the at least one complex image comprises: selecting first and second spatial-frequency portions of the frequency components, generating from a first linear combination of the first and second spatial-frequency portions a first complex image being indicative of phase data of the first interferogram image and from a second linear combination of the first and second spatial-frequency portions a second complex image being indicative of phase data of the second interferogram image; and selecting third and fourth spatial-frequency portions of the frequency components, generating from a first linear combination of the third and fourth spatial-frequency portions a third complex image being indicative of phase data of the third interferogram image and from a second linear combination of the third and fourth spatial-frequency portions a fourth complex image being indicative of phase data of the fourth interferogram image, the first and second linear combinations comprise a transposition of one of the first and second spatial-frequency portions. The first and second spatial-frequency portions of the frequency components are associated with a first image plane axis (summed interferogram) and the third and fourth spatial-frequency portions of the frequency components are associated with a second image plane axis (summed interferogram). Advantageously, the first and second image plane axes are orthogonal.

In some possible embodiments, the at least one interferogram image comprises a plurality of interferogram images consecutively acquired in real time by an imager within a certain time period, the method further comprising generating in real time a video stream from the respectively generated complex images.

In another aspect there is provided a non-transitory computer readable medium storing instructions that when executed by a processor causes the processor to perform the above-described methods of processing phase data of off-axis interferogram image.

In yet another aspect there is provided a phase processor configured to process phase data of off-axis interferogram images. The phase processor comprises a transformation unit configured to decompose at least one sample-related interferogram image and generate respective sample-related spectra data indicative thereof, a cropper configured to crop a defined portion of the sample-related spectra data, an inverse transformation unit configured to generate from the cropped spectra data portions at least one sample-related complex image indicative of phase data of the sample-related interferogram image and having a reduced size being smaller in size than (1/16 of) the sample-related interferogram image, and a phase unwrap unit configured to unwrap image phase of the at least one reduced size complex image.

Optionally, and in some embodiments preferably, the phase processor comprise an up-sampler configured to enlarge the size of the phase image and provide an enlarged phase image which size substantially equals to the size of the sample-related interferogram image. In some embodiments the processor comprises a divider unit, the processor is configured to use the transformation unit, the cropper and the inverse transformation unit, to process at least one sample-free interferogram image and generate therefrom at least one sample-free complex image, and use the divider unit to divide values of the at least one sample-related complex image by respective values of the at least one sample-free complex image, before the phase extraction and the phase unwrapping stage.

Optionally, a down-sampler is used to reduce a size of the interferogram images decomposed by the transformation unit. In such embodiments, the transformation unit is preferably configured to perform one-dimensional data transformations.

In some possible embodiments, the processor comprises an image generator configured to generate at least some of the sample-related interferogram images decomposed by the transformation unit, the sample-related interferogram images being generated from first and second sample-related interferogram images, the image generator comprising a transposition unit configured to generate a transposed form of the second sample-related interferogram image and a summation unit configured to generate a summated image from the first sample-related interferogram image and the transposed form of the second sample-related interferogram image. In such embodiments, the cropper comprises first and second cropper devices and a transposition unit configured to generate a transposed form of the spectra data, the first cropper device configured to crop a spatial-frequency portion of the spectra data and the second cropper device configured to crop a spatial-frequency portion of the transposed form of the spectra data, the inverse transformation unit comprises first and second inverse transformation devices, the first inverse transformation device configured to generate from the spatial-frequency portion of the spectra data a complex image indicative of phase data of the first sample-related interferogram image, and the second inverse transformation device configured to generate from the spatial-frequency portion of the transposed form of the spectra data a complex image indicative of phase data of the second sample-related interferogram image, and the phase unwrap unit comprises first and second phase un-wrap devices, the first phase un-wrap device configured to unwrap phase data of the complex image from the first inverse transformation device, and the second un-wrapper device configured to unwrap phase data of the complex image from the second inverse transformation device.

Optionally, and in some embodiments preferably, the processor is configured to divide values of the complex images from the first and second phase un-wrap devices by respective values of the at least one sample-free complex image, before the phase unwrapping stage.

Alternatively, the processor comprises an image generator configured to generate at least some of the sample-related interferogram images decomposed by the transformation unit as complex interferogram images generated from first and second sample-related interferogram images, the image generator comprising a summation unit configured to construct at least some sample-related interferogram images using the first and second sample related interferogram images as real and imaginary parts, respectively, of the complex interferogram image. In such embodiments the processor further comprises first and second image constructors, and the cropper unit comprises first and second cropper devices configured to crop first and second spatial-frequency portions of the sample-related spectra data, respectively, the first and second image constructors are respectively configured to generate from a first linear combination of the first and second spatial-frequency portions a first spectral domain image being indicative of phase data of the first sample-related interferogram image and from a second linear combination of the first and second spatial-frequency portions a second spectral domain image being indicative of phase data of the second interferogram image, the first and second linear combinations comprise a transposition of one of the first and second spatial-frequency portions, the inverse transformation unit comprises first and second inverse transformation devices configured to respectively generate from the spectral domain images first and second complex images, and the phase unwrap unit comprises first and second phase un-wrap devices configured to respectively unwrap phase data of the first and second complex images.

Optionally, and in some embodiments preferably, the processor comprises a down-sampler configured to reduce a size of the first and second sample-related interferogram images.

Optionally, and in some embodiments preferably, the processor is configured to divide values of first and second complex images by respective values of the at least one sample-free complex image, before the phase unwrapping stage.

In another alternative embodiments, the processor comprises an image generator configured to generate at least some of the interferogram images decomposed by the transformation unit as a complex interferogram image constructed from first, second, third and fourth, sample-related interferogram images, the image generator comprising a first summation unit configured to generated a summation image from the first sample-related interferogram image and transposition of the second sample-related interferogram image, a second summation unit configured to generated a summation image from the third sample-related interferogram image and transposition of the fourth sample-related interferogram image, a third summation unit configured to construct a complex sample-related interferogram image using the first and second summation images as real and imaginary parts, respectively. In such embodiments the processor comprises first, second, third and fourth, image constructors, the cropper unit comprises first and second cropper devices, the first cropper device configured to crop first and second spatial-frequency portions of the sample-related spectra data, the first and second spatial-frequency portions being associated with a first image plane axis, and the second cropper device configured to crop third and fourth spatial-frequency portions of the sample-related spectra data, the third and fourth spatial-frequency portions being associated with a second image plane axis, the first image constructor configured to generate from a first linear combination of the first and second spatial-frequency portions a first spectral domain image being indicative of phase data of the first sample-related interferogram image, the second image constructor configured to generate from a second linear combination of the first and second spatial-frequency portions a second spectral domain image being indicative of phase data of the second interferogram image, the first and second linear combinations comprise a transposition of one of the first and second spatial-frequency portions, the third image constructor configured to generate from a first linear combination of the third and fourth spatial-frequency portions a third spectral domain image being indicative of phase data of the third sample-related interferogram image, the fourth image constructor configured to generate from a second linear combination of the third and fourth spatial-frequency portions a fourth spectral domain image being indicative of phase data of the fourth interferogram image, the first and second linear combinations comprise a transposition of one of the first and second spatial-frequency portions, the inverse transformation unit comprises first, second, third and fourth, inverse transformation devices configured to respectively generate from the first, second, third and fourth, spectral domain images first, second, third and fourth, complex images, and the phase unwrap unit comprises first, second, third and fourth, phase un-wrap devices configured to unwrap phase data of the first, second, third and fourth, complex images.

Optionally, and in some embodiments preferably, the processor is configured to divide values of the first, second, third and fourth, complex images by respective values of the at least one sample-free complex image, before the phase unwrapping stage.

In some embodiments the sample-related interferogram images processed by the phase processor are part of a stream of sample-related interferogram images consecutively acquired by an imager within a determined period of time, and the phase processor is configured to instantly generate in real time (i.e., without causing time delays) a video stream of the processed sample-related interferogram images.

Optionally, and in some embodiments preferably, the transformation unit and devices, the cropper unit and devices, the inverse transformation unit and devices, the divider, the transposition units, and/or the phase unwrap unit and devices, are implemented as software modules executed by means of one or more processing and memory units of the phase processor.

BRIEF DESCRIPTION OF THE DRAWINGS

The patent or application file contains at least one drawing executed in color. Copies of this patent or patent application publication with color drawings will be provided by the Office upon request and payment of the necessary fee.

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 1A to 1C depict principles of off-axis wide-field interferometric phase microscopy;

Figure 2A:
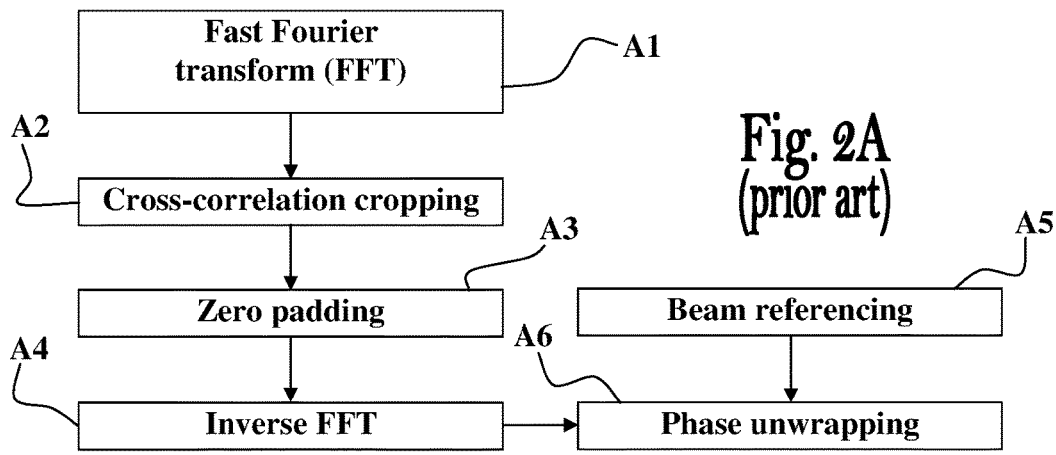
FIG. 2A and FIG. 2B schematically illustrate a phase extraction technique for off-axis interferograms (also referred to herein as process A)

It is noted that the embodiments exemplified in the figures are not intended to be in scale and are in diagram form to facilitate ease of understanding and description.

DETAILED DESCRIPTION OF EMBODIMENTS

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, emphasis instead being placed upon clearly illustrating the principles of the invention. This invention may be provided in other specific forms and embodiments without departing from the essential characteristics described herein.

The present invention provides improved techniques that significantly decrease the extraction time of the sample quantitative phase profile without limitation on the samples that can be quantitatively imaged. The techniques described herein were used to obtain processing frame rates of up to 45 fps for one megapixel off-axis interferograms including solving the $2\pi$ phase ambiguity problem, and up to 150 fps without solving it using a conventional personal computer (Intel i7-2600, 3.4 GHz CPU, 8 GB RAM). The present invention thus can be used for off-axis holography and interferometry for real-time thickness profiling in industry, clinics/laboratories, using conventional computer resources, and can be used in various different applications, such as, but not limited to, metrology, wafer and electronic inspection, and biomedical imaging.

The various different embodiments described herein were used to process the phase maps of a sample of red blood cells (RBCs) on a regular computer, and in the first time to the inventors' knowledge, showed processing of the cell membrane fluctuations maps at video frame rate for one megapixel off-axis holograms using a standard computer.

FIG. 1A shows a typical off-axis wide-field interferometric phase microscopy system 10. In this non-limiting example the light from the laser source 11 is split by the first beam splitter (BS) 12a into a reference beam 13r and an object beam 13b, having two different, and substantially equidistant, optical paths. The object beam 13b is transmitted by the mirror 15a through the sample 14 and the microscope objective 17 towards the second beam splitter 12b, while the reference beam 13r is transmitted by the mirror 15b towards the second beam splitter 12b. The object beam 13b and reference beam 13r are combined at the second beam splitter 12b and projected therefrom onto a digital camera 18, thereby obtaining an off-axis interferogram of the sample on the camera 18. Other off-axis interferometers can be similarly used for obtaining the off-axis interferogram needed for the digital processing in the different embodiments disclosed herein.

FIGS. 1B and 1C exemplify an off-axis interferogram image 18i and a respective phase image 18p thereof, acquired by the interferometric phase microscopy system. The recorded interference pattern received by the digital camera 18, also called the off-axis hologram, can be mathematically expressed by the following equation:

$$I(x, y) = |E_s(x, y)|^2 + |E_r|^2 + E_s^*(x, y)E_r + E_s(x, y)E_r^* \quad (1)$$

$$= I_s(x, y) + I_r + 2\sqrt{I_s(x, y)I_r} \cos\left(\frac{2\pi}{\lambda}[OPD(x, y) - y\sin(\theta_y) - x\sin(\theta_x)]\right),$$

where $E_s$ and $E_r$ are the recorded sample and reference complex wave signals (associated with the object beam 13b and the reference beam 13r) respectively, $I_s$ and $I_r$ are the intensities of the sample and reference wave signals, respectively, $\lambda$ is the illumination wavelength, OPD is the total optical path delay (or optical thickness) of the sample 14, and $\theta_x$ and $\theta_y$ are the off-axis angles between the sample and reference waves in relation to the 'x' (the horizontal axis in the image plane) and 'y' (the vertical axis in the image plane) axes, respectively, assuming straight fringes. For a well-designed system, by controlling $\theta_x$ and $\theta_y$, a full separation between the auto-correlation terms ($E_s^2$ and $E_r^2$ or $I_s$ and $I_r$ in the spatial-frequency domain) and the cross-correlation terms ($E_s^*E_r$ and $E_sE_r^*$ in the spatial-frequency domain) is obtained, which allows complete extraction of the sample wave-front from Eq. (1).

Figure 2B:
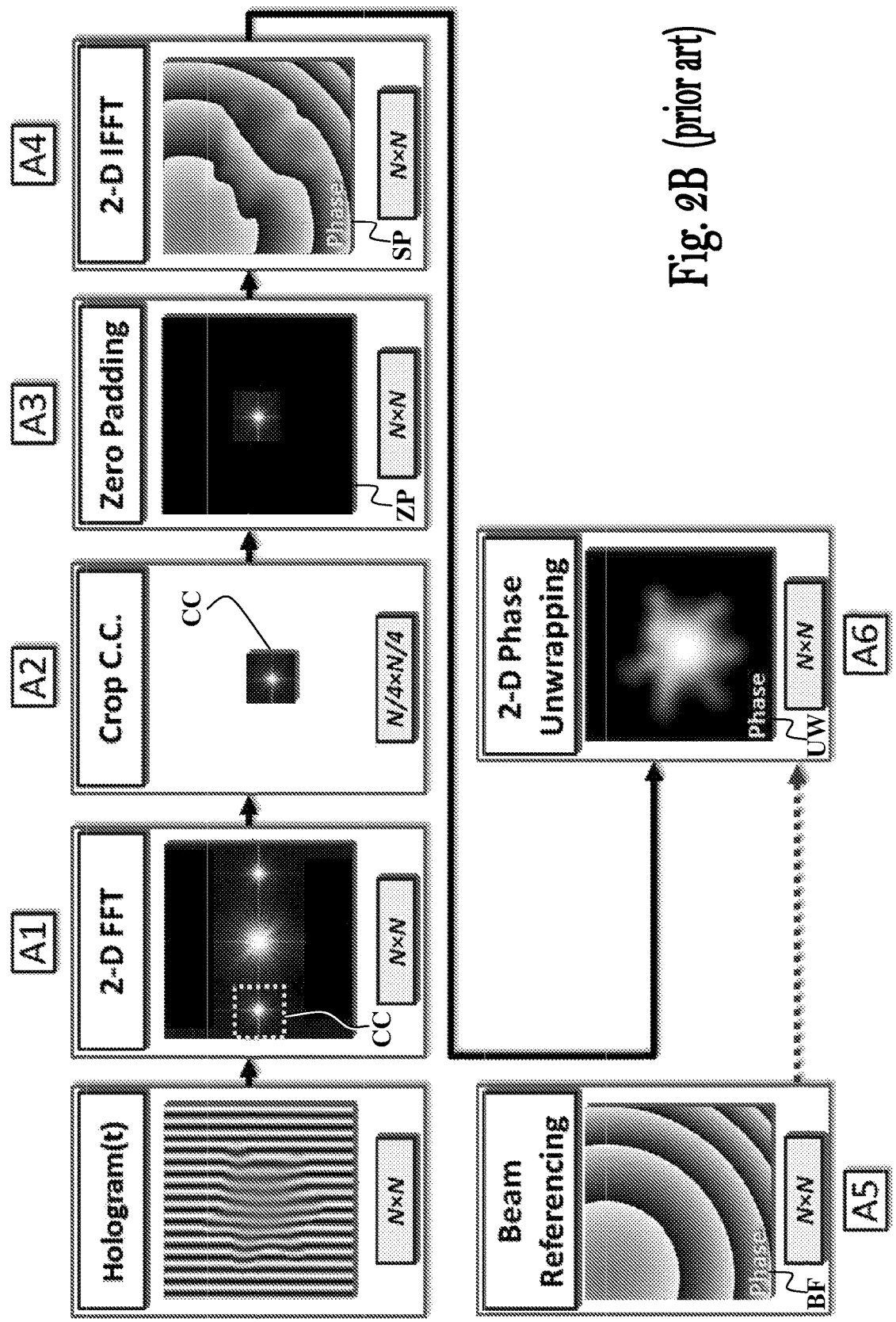

FIGS. 2A and 2B demonstrate reconstruction of a sample quantitative phase map as conventionally performed, based on spatial filtering using Fourier transforms. This reconstruction process includes the following steps:

A1. Two-dimensional fast Fourier transform (2D FFT): transform the digital hologram, containing N×N real pixels, to the spatial-frequency domain using a 2D FFT, resulting in a matrix containing N×N complex pixels.

A2. Cross-correlation cropping: Crop the N/4×N/4 cross-correlation portion CC of the N×N complex pixels matrix (by defining a N/4×N/4 matrix composed by cutting the original Fourier plane around the center of the CC). In an efficient system, the entire wave-front spatial-frequency content occupies N/4×N/4 pixels.

A3. Zero padding (ZP): Insert the cropped cross-correlation CC N/4×N/4 matrix to the center of an empty matrix containing N×N zero valued pixels.

A4. 2D inverse FFT (2D IFFT): Convert the zero-padded cross-correlation matrix ZP back to the image domain using a 2D IFFT, resulting in an N×N complex matrix SP representing the sample wave-front.

A5. Beam referencing: To compensate for stationary aberrations and curvatures in the beam profile, before conducting the sample interferogram measurements, acquire a hologram without the sample 14, and process it into the sample-free wave-front BF using steps A1-A4 described above. Thereafter, the sample wave-front SP obtained in step A4 is divided by the sample-free wave-front BF (SP/BF i.e., each value of SP is divided by a respective value of BF, which is after taking the argument, is the input matrix to the unwrapping of the next step).

A6. Phase unwrapping: The argument of the resulting N×N complex matrix SP is the wrapped phase map of the sample, and it is subjected to 2π ambiguities in cases that the optical thickness of the sample is greater than the illumination wavelength. Thus, a 2D phase unwrapping process is used to take the wrapped phase of step A5 and obtain another N×N matrix UW of the unwrapped phase map, free of 2π ambiguities.

It is noted that the cross-correlation cropping described above in step A2, and also as used in the phase extraction processes described hereinbelow, may be adapted to crop different sizes of cross-correlation portion of the N×N complex pixels (i.e., not limited to a portion size of N/4×N/4).

Figure 3A:
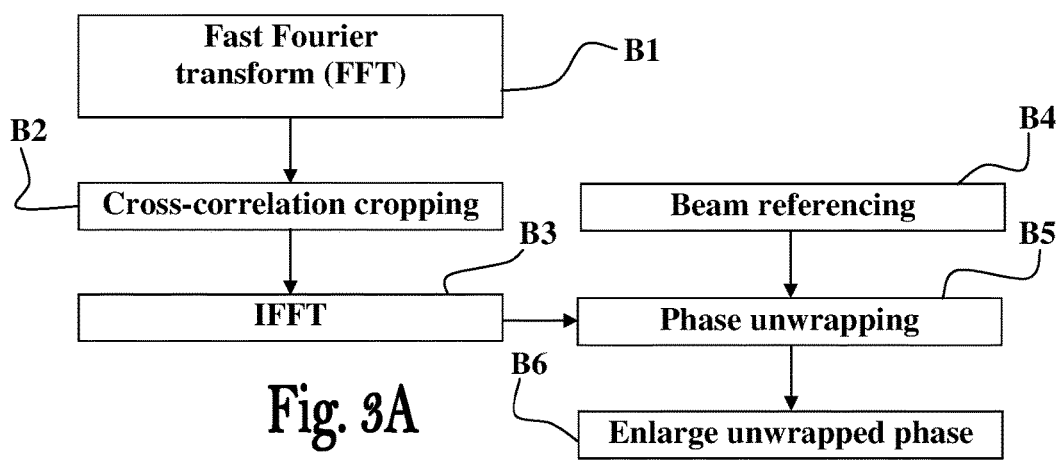
FIGS. 3A to 3C schematically illustrate an improved phase extraction technique for off-axis interferograms according to some possible embodiments (also referred to herein as process B)
Figure 3C:
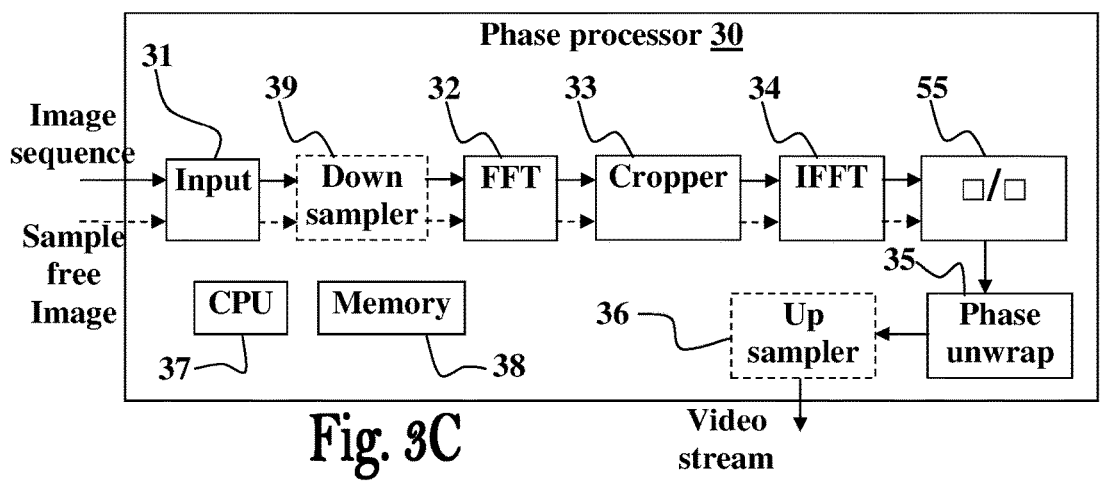
Figure 3B:
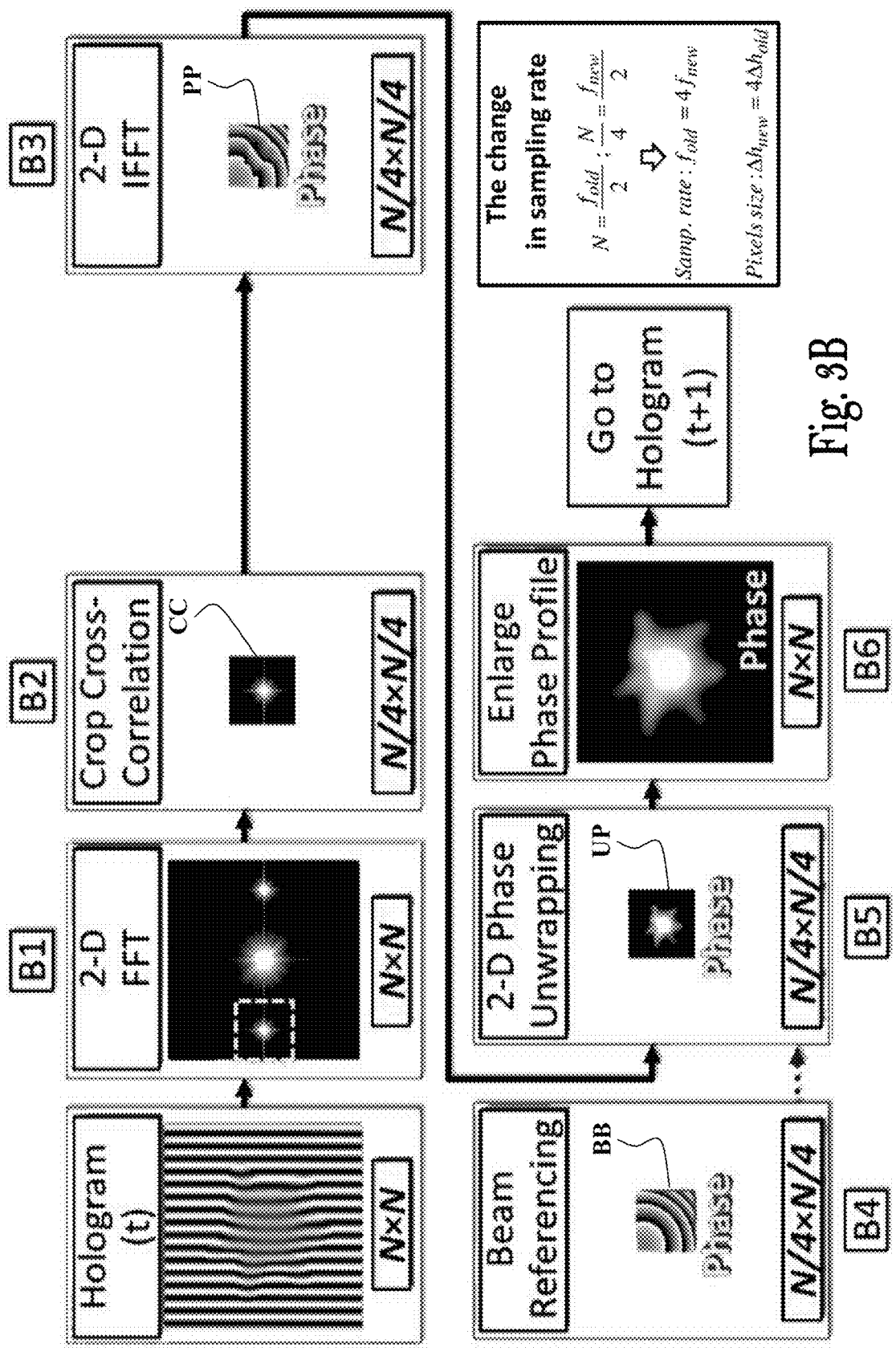

FIGS. 3A and 3B schematically illustrate an improved phase extraction technique for off-axis interferograms that decreases the number of pixels calculated by the 2D IFFT and by the unwrapping algorithm. The speed of this phase extraction is substantially improved by skipping step A3 in FIG. 2, and thus reducing the matrix size to be processed by the following steps by a factor of 16, without losing sample information. This is possible since the image in the initial off-axis hologram is spatially sampled at a higher rate to avoid overlaps between the cross-correlation and the auto-correlation terms. This improved phase extraction process includes the following steps:

B1. 2D FFT: Similar to step A1 in FIG. 2.
B2. Cross-correlation cropping: Similar to step A2 in FIG. 2.
B3. 2D IFFT: Convert the N/4×N/4 cropped cross-correlation CC back to the image domain using a 2-D IFFT, resulting in an N/4×N/4 complex matrix PP representing the sample wave-front.
B4. Beam referencing: Before conducting the sample interferogram measurements, calculate the N/4×N/4 sample-free wave-front BB (without the sample 14) by repeating steps B1-B3 above, and divide the sample wave-front PP by the sample-free wave-front BB.
B5. Phase unwrapping: The argument of the resulting N/4×N/4 matrix PP is the wrapped phase map of the sampled interferogram. To solve 2π ambiguities, a 2D phase unwrapping process is applied to the wrapped phase of step B4 apply, which results in the N/4×N/4 unwrapped phase matrix UP.
B6. Enlarge unwrapped phase map: Enlarge the N/4×N/4 unwrapped phase matrix UP of step B5 to the final N×N unwrapped phase matrix (e.g., extrapolation).

FIG. 3C is a block diagram schematically illustrating a phase processor 30 configured to receive a stream of sample-related interferogram images and a sample-free interferogram image, for determining and unwrapping a phase image of each of the interferogram images in the received stream of images, and generate a respective video stream based thereon. The phase processor 30 comprises an input unit 31 configured to receive the sequence of sample-related interferogram images and the sample-free interferogram image, a transformation unit 32 configured to generate from the images received by the input unit 31 spatial-frequency domain images, a cropper (digital cropping) configured to extract a spatial-frequency portion of the spatial-frequency domain images from the transformation unit 32, an inverse transformation unit 34 configured to generate from the extracted spatial-frequency portions from the cropper 33 complex images, a matrix divider 55 configured to divide the values of sample-related complex images by the values of sample-free complex image, and phase unwrap unit 35 configured to resolve phase ambiguities in the complex images from the divider 55.

Optionally, and in some embodiments preferably, the phase processor further comprises a down sampler 39 configured to perform asymmetric re-sampling of the received interferogram images along an image plane axis, so as to reduce sizes of said interferogram images along said image plane axis, as will be explained below with reference to FIGS. 6A and 6B. Optionally, the image plane axis used for the re-sampling substantially coincides with direction of fringes of the interferogram images in the received stream.

The processing of the sample-free interferogram is denoted by dashed arrowed lines, and seen, it is subject to the same processing stages applied to the images of the stream of interferogram images. Optionally, in possible embodiments a separate processing path (not shown) is provided for processing the sample free image separately. As also seen, after the phase unwrapping stage an up-sampler unit 36 may be used to enlarge the processed images to the size of the interferogram images received at the input stage 31.

In some embodiments the phase processor 30 is a computerized device comprising one or more processors 37 and memories 38, configured and operable to use computer programs to operate the phase processor 30. Optionally, and in some embodiments preferably, one or more of the units 31-36 and 39, are implemented as software modules. Alternatively, one or more of the units 31-36 and 39, are implemented by hardware, or as a combination of software and hardware.

Figure 4A:
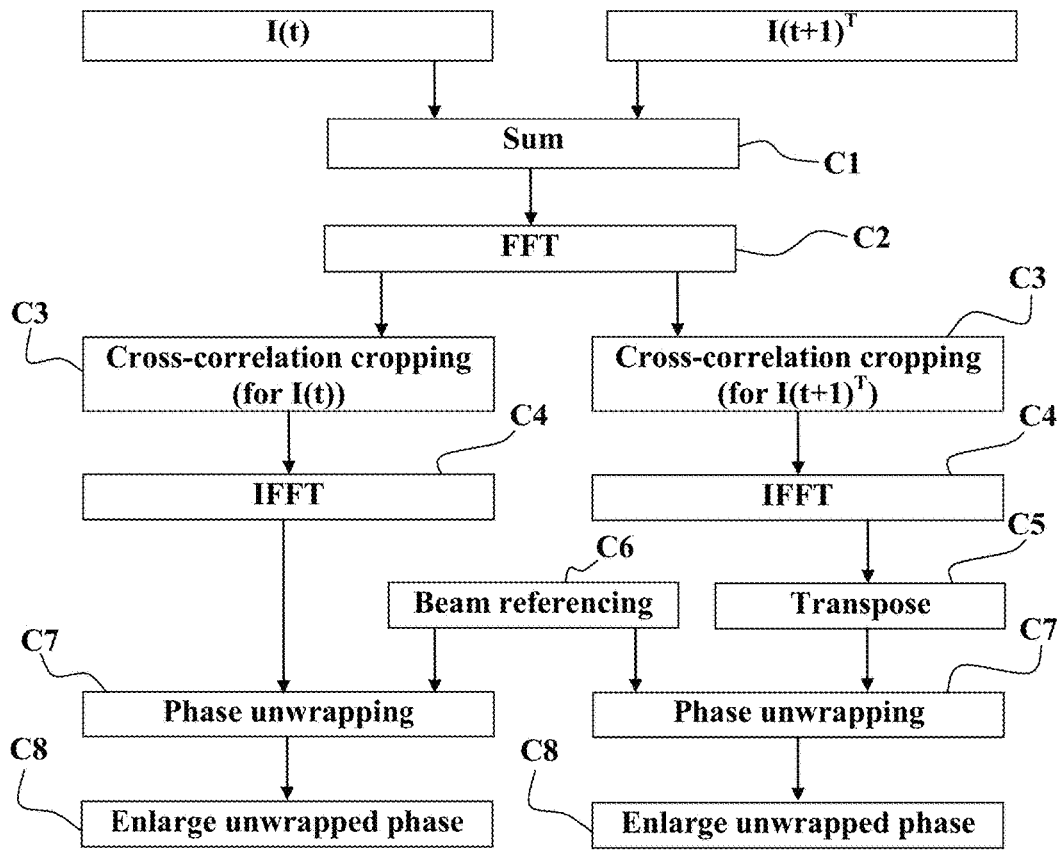
FIGS. 4A to 4D schematically illustrate an improved phase extraction technique for off-axis interferograms according to some possible embodiments utilizing sample summation for concurrently processing two interferograms (also referred to herein as process C)
Figure 4D:
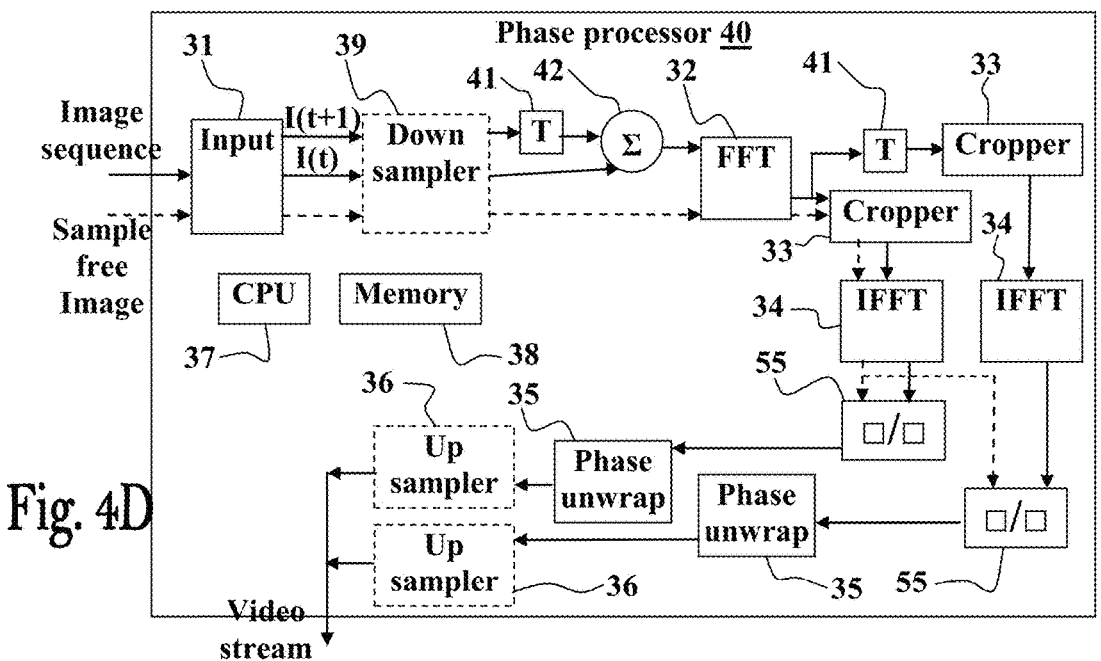
Figure 4B:
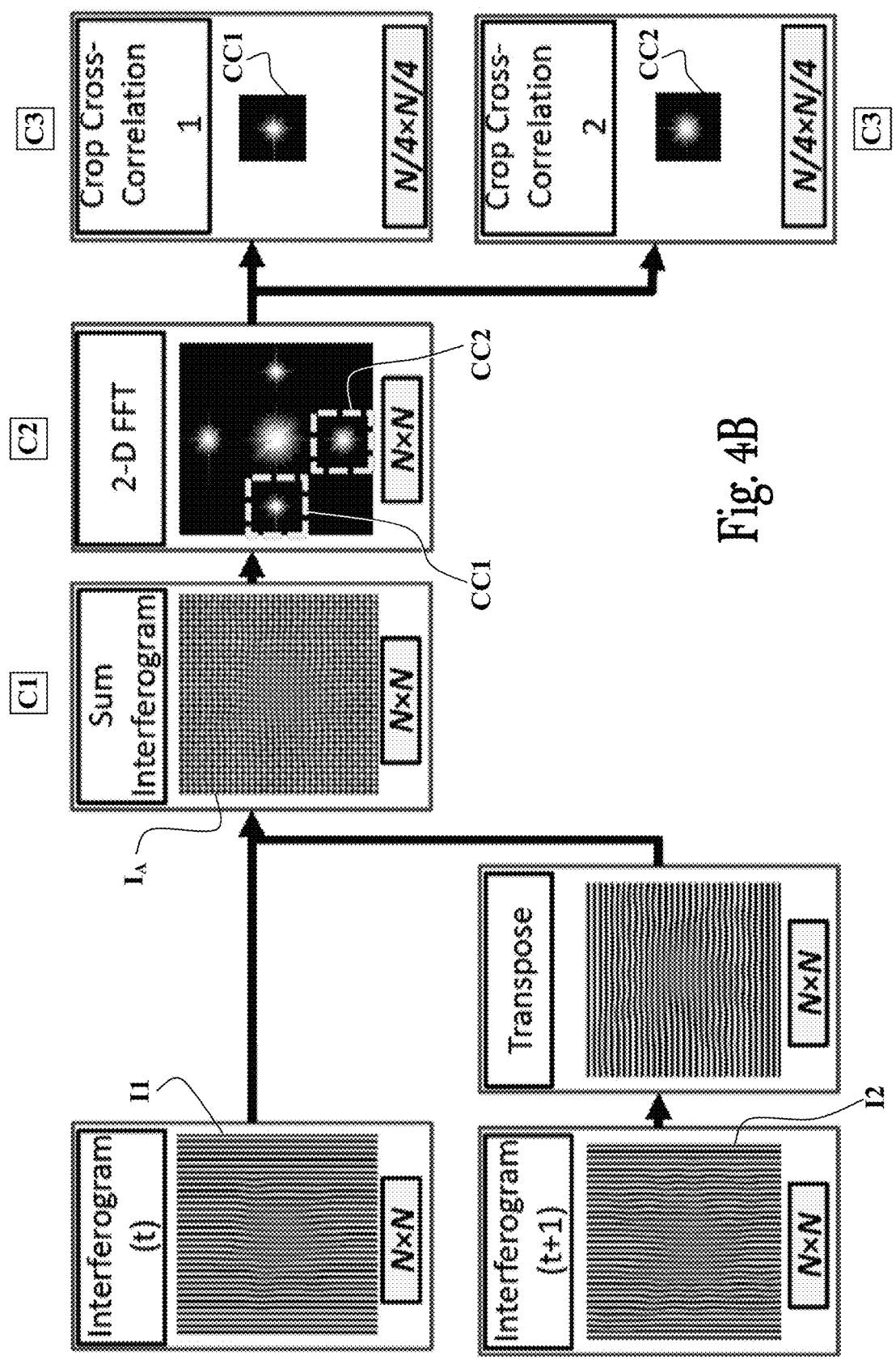
Figure 4C:
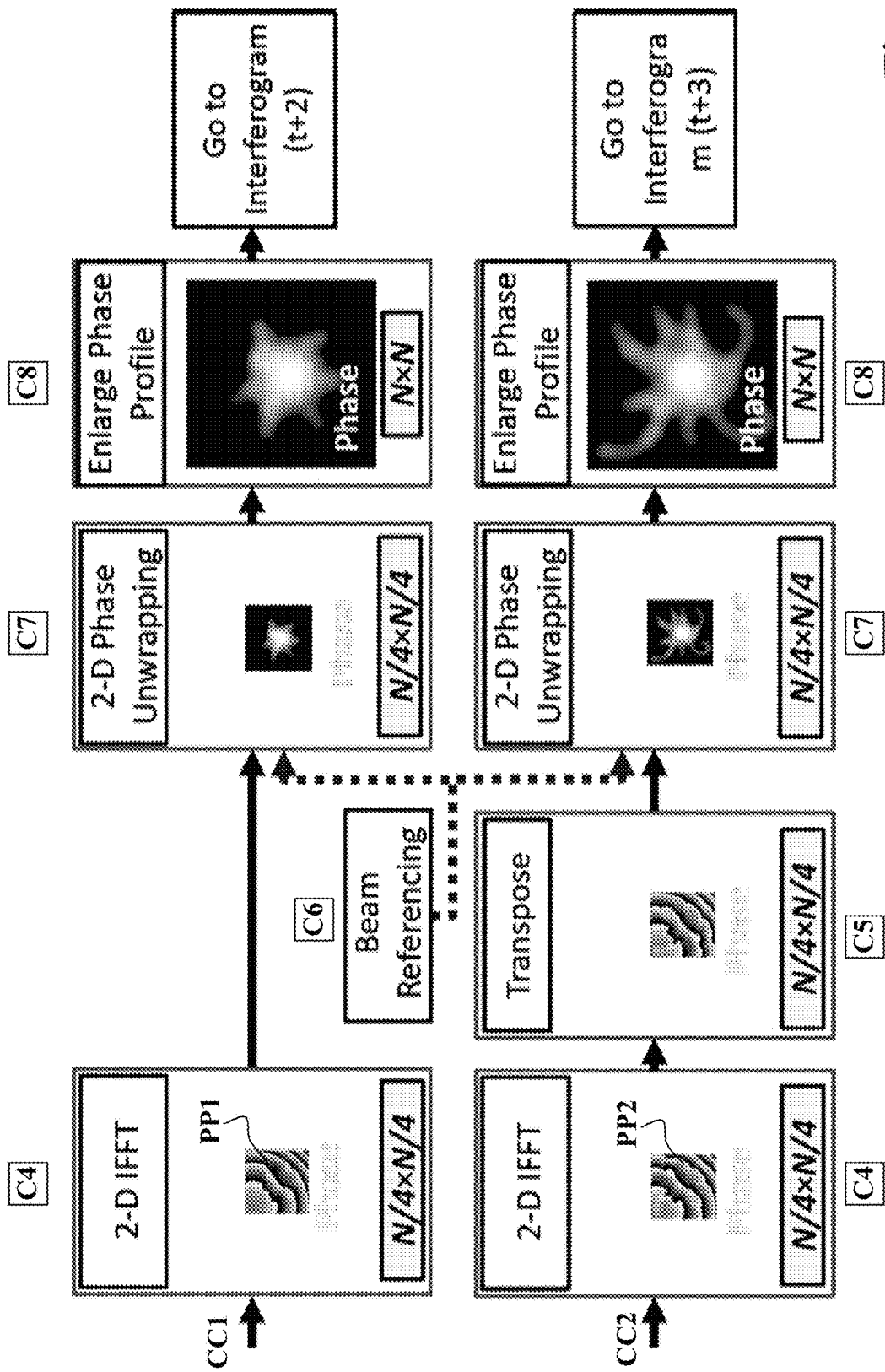

FIGS. 4A to 4C schematically illustrate an improved phase extraction technique for off-axis interferograms utilizing interferogram summation/superimposition, for concurrently processing two interferograms (e.g., off-axis holograms from the hologram sequence) within the same extraction process. In this way, a single Fourier transform module can be used to process the superimposed interferogram comprising the data of the two summated interferograms, instead of using two separate Fourier transform modules to process each interferogram separately, which further decreases the overall calculation time and improve performance. This phase extraction process includes the following steps:

C1. Hologram summation: Sum hologram $I_1$ (I(t) in FIG. 4A) with a transverse (90°-rotated) version of the next hologram $T\{I2\}$ ($I(t+1)^T$ in FIG. 4A), which yields the multiplexed hologram $I_A=I_1+T\{I_2\}$ containing N×N pixels.
C2. 2D FFT: Similar to step A1 or B1 in FIGS. 2 and 3.
C3. Cross-correlation cropping ×2: Crop the vertical cross-correlation CC2 and the horizontal cross-correlation CC1, each containing N/4×N/4 pixels.
C4. 2D IFFT ×2: Similar to step B3 in FIGS. 3A-B, but for both the horizontal (CC1) and the vertical (CC2) cross-correlation matrices. This results in two N/4×N/4 complex wave-fronts, PP1 and PP2, respectively.
C5. Transposing: Rotate the complex wave-front PP2 originated from the vertical cross-correlation in −90°, to obtain the transposition $T\{PP2\}$.
C6. Beam referencing: Similar to step B4 in FIG. 3, but for both wave-fronts.
C7. Phase unwrapping ×2: Similar to step B5 in FIG. 3, but for both PP1 and $T\{PP2\}$ wave-fronts.
C8. Enlarge unwrapped phase map ×2: Similar to step B6 in FIG. 3, but for the unwrapped product obtained in step C7 for both PP1 and $T\{PP2\}$ wave-fronts.

FIG. 4D is a block diagram schematically illustrating a phase processor 40 configured to receive a stream of sample-related interferogram images and a sample-free interferogram image, for determining and unwrapping a phase image of each of the interferogram images in the received stream of images, and generate a respective video stream based thereon, using a single transformation unit 32. The phase processor 40 comprises an input unit 31 configured to receive the sequence of sample-related interferogram images and the sample-free interferogram image, a transposition unit 41 configured to transpose an interferogram I(t+1) image from the input stage 31, a summation unit 42 configured sum the transposed image I(t+1)$^T$ from the transposition unit 41 and a preceding interferogram image I(t) from the image stream, an image transformation unit 32 configured to generated from the image received by the summation unit 42 a spatial-frequency domain image, an additional transposition unit 41 configured to transpose the spatial-frequency domain image from the transformation unit 32, two croppers configured to extract spatial-frequency portions of the spatial-frequency domain image from the transformation unit 32 and of the transposed spatial-frequency domain image from the additional transposition unit 41, two inverse transformation units 34 configured to generate from the extracted spatial-frequency portions from the croppers 33 respective complex images, two matrix divider units 55 configured to divide the values of the two sample-related complex images by the values of the sample-free complex image, and two phase unwrap units 35 configured to resolve phase ambiguities in the complex images from the matrix divider units 55.

Optionally, and in some embodiments preferably, the phase processor further comprises a down sampler 39 configured to perform asymmetric re-sampling of the received interferogram images along an image plane axis, so as to reduce sizes of said interferogram images along said image plane axis, as will be explained below with reference to FIGS. 6A and 6B. Optionally, the image plane axis used for the re-sampling substantially coincides with direction of fringes of the interferogram images in the received stream.

The processing of the sample-free interferogram is denoted by dashed arrowed lines, and as seen, it is subject to the same processing stages applied to the images of the stream of interferogram images. Optionally, in possible embodiments a separate processing path (not shown) is provided fort processing the sample free image separately. As also seen, the after the phase unwrapping stage two respective up-sampler units 36 may be used to enlarge the processed images to the size of the interferogram images received at the input stage 31.

In some embodiments the phase processor 40 is a computerized device comprising one or more processors 37 and memories 38, configured and operable to use computer programs to operate the phase processor 40. Optionally, and in some embodiments preferably, one or more of the units of the phase processor 40, are implemented as software modules. Alternatively, one or more of these units, are implemented by hardware, or as a combination of software and hardware.

Figure 5A:
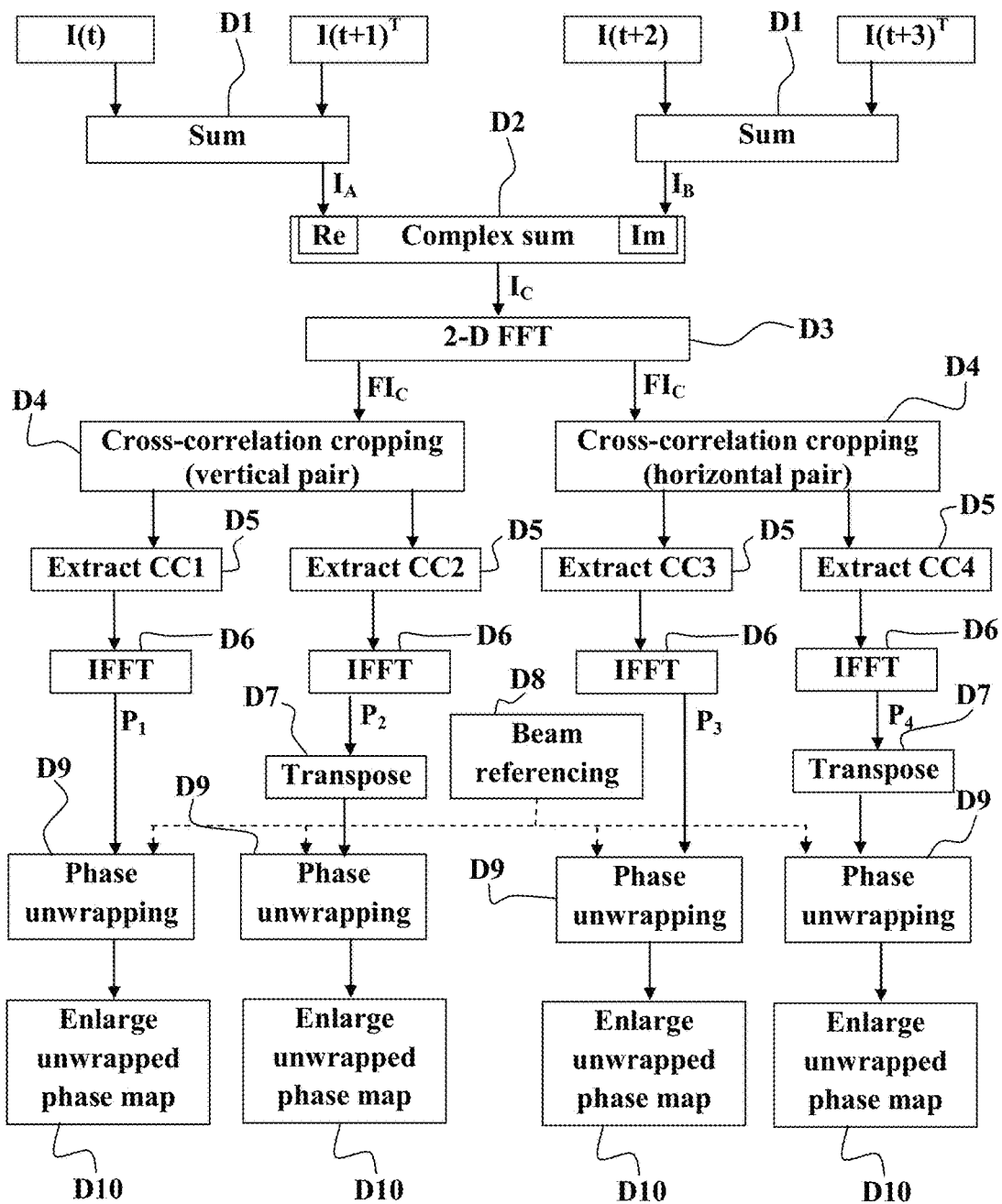
FIGS. 5A to 5C schematically illustrate an improved phase extraction technique for off-axis interferograms according to some possible embodiments utilizing complex FFT and interferograms summation for concurrently processing four interferograms (also referred to herein as process D)
Figure 5B:
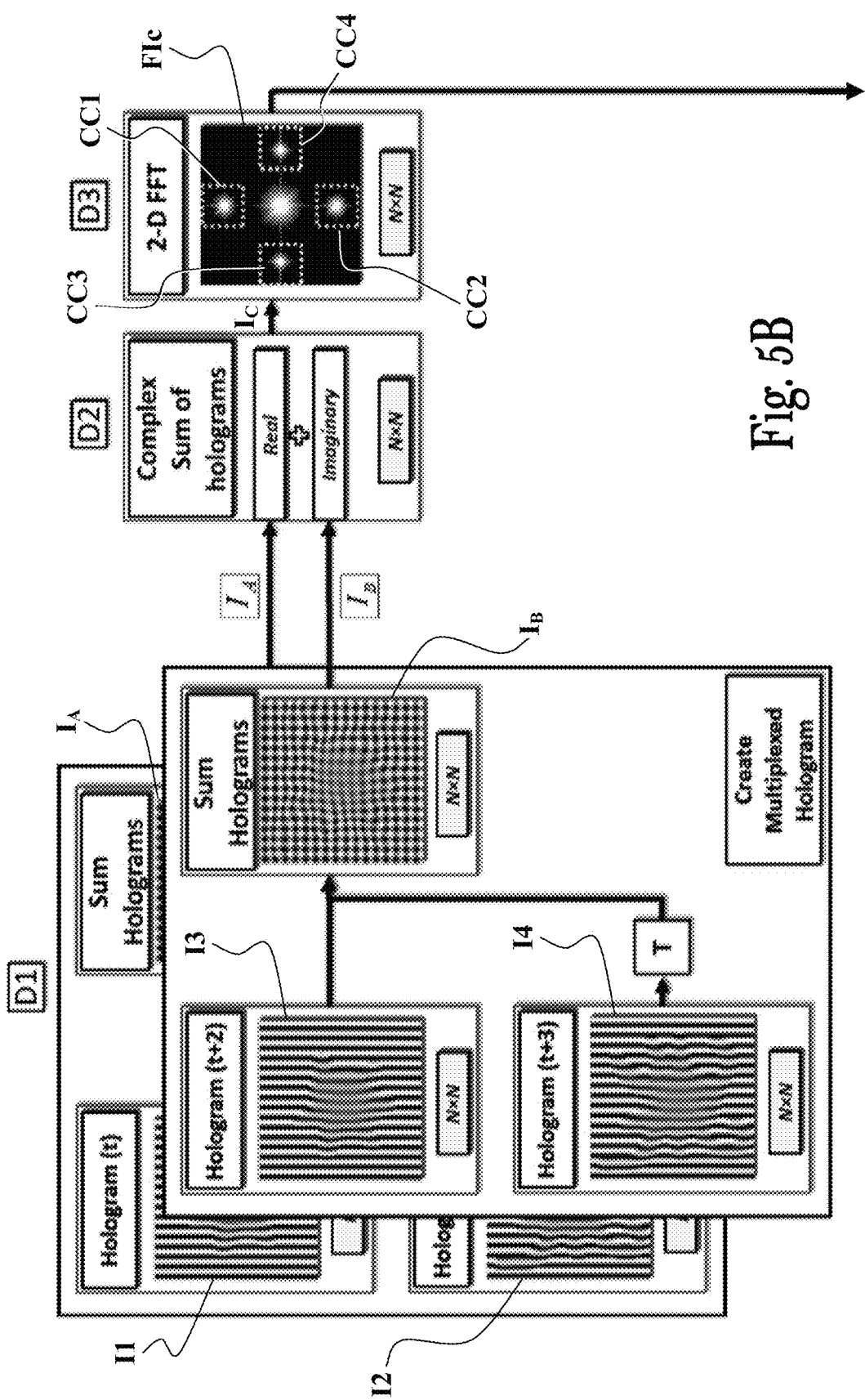
Figure 5C:
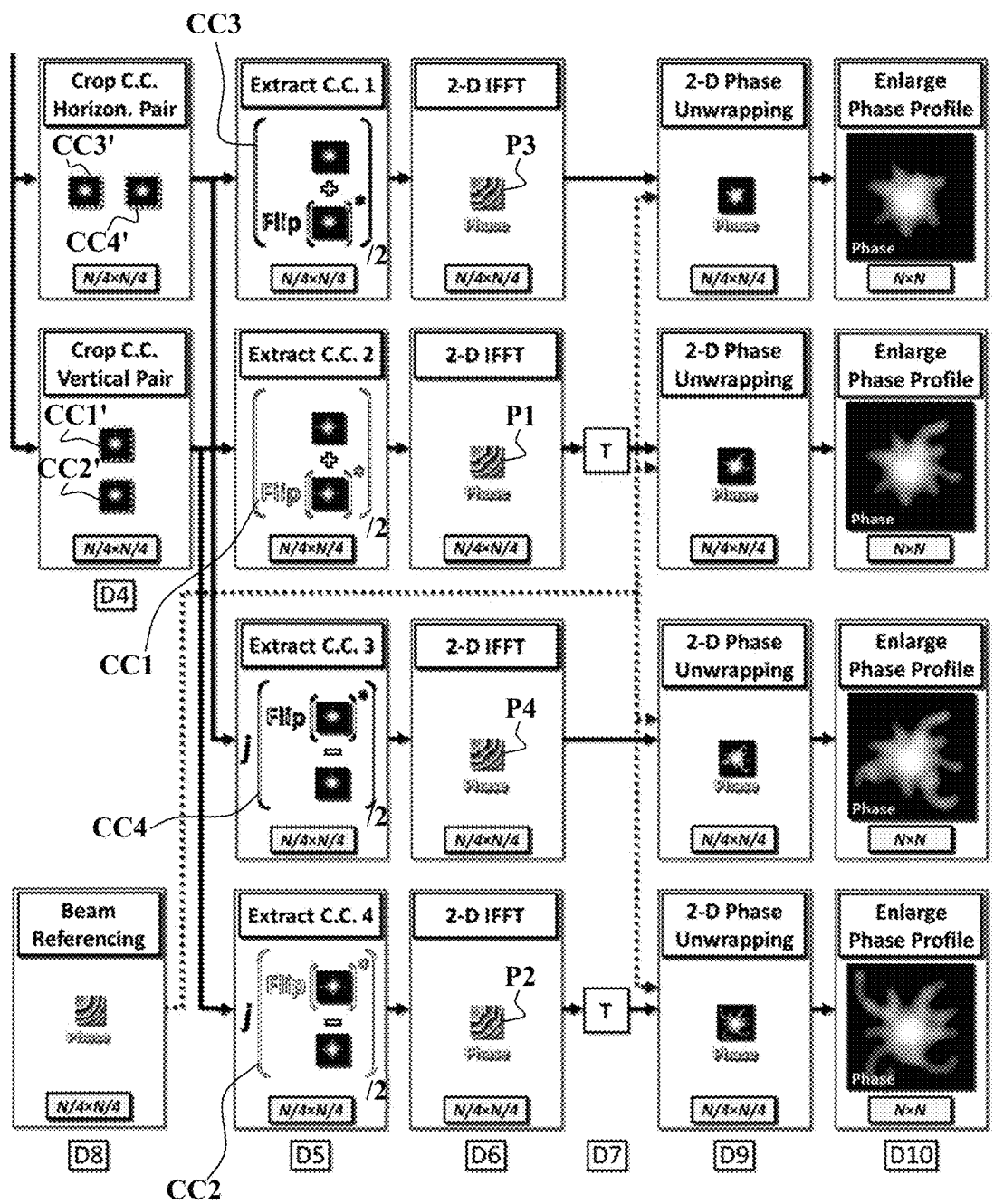

Since Fourier transform is an operation performed on complex variables and the recorded holograms do not have an imaginary part, the typically-used Fourier transform calculation is inefficient. As such, it is possible to exploit the imaginary part to create a complex hologram from two successive holograms. Each of these initial holograms may be a multiplexed hologram, containing two wave-fronts, as exemplified in FIGS. 5A to 5C. Then, by using a single 2D FFT on the complex multiplexed hologram, four wave-fronts are simultaneously processed. After the 2D FFT, since the real and imaginary parts are mixed, decoding is needed to extract the four original cross-correlation terms.

The encoding of the complex hologram $I_C$ is done as follows:

$$I_C(m,n)=I_A(m,n)+jI_B(m,n) \quad (2)$$

where $I_A$ and $I_B$ are two multiplexed holograms. Thus, in the first stage the two successive multiplexed holograms $I_A$ and $I_B$ are decoded into a single complex hologram $I_C$.

For extraction of the four wave-fronts encoded into the complex multiplexed hologram $I_C$, only a single 2D FFT on $I_C$ is needed. To show this, an analysis of the inverse connections between the complex hologram and its real and imaginary parts provides:

$$I_A(m,n) = \frac{I_C(m,n)+I_C^*(m,n)}{2}; I_B(m,n) = j\frac{I_C^*(m,n)-I_C(m,n)}{2}. \quad (3)$$

Then, we note that—

$$FFT\{I_C^*\}(m,n)=FFT\{I_C\}^*(M-m,N-n)=Flip\{FFT\{I_C\}^*(m,n)\},$$

where N and M are the sizes of the matrix. Therefore, the 2D FFT of $I_C^*$ can be calculated out of the 2D FFT of $I_C$ by flipping it on the two axes and conjugating the values of the flipped matrix. As such, the 2D FFT of $I_A$ and $I_B$ can be calculated only from the 2D FFT of $I_C$, and can be expressed as follows:

$$FFT\{I_A\}(m,n) = \frac{FFT\{I_C\}(m,n)+Flip\{FFT\{I_C\}^*(m,n)\}}{2}; \quad (4)$$

$$FFT\{I_B\}(m,n) = j\frac{Flip\{FFT\{I_C\}^*(m,n)\}-FFT\{I_C\}(m,n)}{2}.$$

Therefore, in order to calculate the 2D FFT of $I_A$ and $I_B$, it is enough to calculate only once the 2D FFT of $I_C$ and then use Eq. (4).

Furthermore, since only one cross-correlation term from each conjugate pair is useful in this case, there is no need to perform the addition and subtraction operations of Eq. (4) on the entire matrices. Instead, it is noted that the flipping operation simply puts the +1 cross-correlation term on the −1 cross-correlation term. Therefore, Eq. (4) can be implemented only on the relevant cross-correlation terms. This process is demonstrated in FIG. 5A to 5C, which include the following steps:

D1. Hologram multiplexing: Sum hologram $I_1$ (I(t) in FIG. 5A) with a transverse (90°-rotated) version of the next hologram $T\{I_2\}$ (I(t+1)$^T$ in FIG. 5A), which yields the multiplexed/superimposed hologram $I_A=I_1+T\{I_2\}$ containing N×N pixels. The same steps are respectively performed on the next two holograms $I_3$ (I(t+2) in FIG. 5A) and $I_4$ (I(t+3) in FIG. 5A) to yield another complex hologram $I_B=I_3+T\{I_4\}$.

D2. Complex summation: Sum the two multiplexed holograms $I_A$ and $I_B$ to construct a complex matrix, where the first multiplexed hologram $I_A$ is the real part of the constructed matrix and the second multiplexed hologram $I_B$ is its imaginary part. This step constructs a complex hologram $I_C$ according to Eq. (2), containing N×N pixels.

D3. 2D FFT: Convert the complex digital hologram $I_C$, containing N×N real pixels $I_A$ and N×N imaginary pixels $I_B$, to the spatial-frequency domain using a 2D FFT, resulting in a matrix $FI_C$ containing N×N complex pixels.

D4. Cross-correlation cropping ×4: Crop the two vertical cross-correlations (CC1' and CC2') and the two horizontal cross-correlations (CC3' and CC4'), each containing N/4×N/4 pixels.

D5. Cross-correlation extraction ×4: Equation (4) is performed only on the required cross-correlation terms (each of them contains N/4×N/4 pixels).

D6. 2D IFFT ×4: Convert the N/4×N/4 extracted horizontal and vertical cross-correlations back to the image domain by using 2D IFFTs, resulting in four N/4×N/4 complex matrices P1, P2, P3 and P4, representing the sample wave-fronts.

D7. Transposing ×2: Similar to step C5 in FIG. 4, but for the two rotated wave-fronts.

D8. Beam referencing: Similar to step B4 in FIG. 3, but for the four wave-fronts.

D9. Phase unwrapping ×4: Similar to step B5 in FIG. 3, but for the four wave-fronts.

D10. Enlarge unwrapped phase profile ×4: Similar to step B6 in FIG. 3, but for the four wave-fronts.

It is noted that the operations of steps D1 and D2, which are two different encoding methods, are interchangeable.

In the phase extraction process shown in FIGS. 4 and 5, empty areas in the spatial-frequency domain are exploited for inserting additional cross-correlation terms, and process all of them with the same 2-D FFT. Still, there are more unused areas in the spatial-frequency domain that can be used. Typically, the sampling rate is equal on both axes, but only one axis of the off-axis hologram contains the fast carrier frequency for the off-axis fringes, which is required for preventing aliasing between the auto-correlation and the cross-correlation terms at one direction. For this reason, it is possible to re-sample down the hologram on the other axis, without losing sample information. In the phase extraction process shown in FIGS. 6A and 6B it is assumed that the off-axis fringes are on one of the axes, so that either $\theta_x$ or $\theta_y$ from Eq. 1 are equal to zero. Then, asymmetric re-sampling of the recorded hologram by a factor of 4 is performed, only across the axis on which there is no off-axis angle. This re-sampling does not damage the other axis, in which the off-axis angle creates the cross-correlation terms separation from the auto-correlation terms, which enables full extraction of the cross-correlation terms. Then, 1-D FFT can be used instead of 2-D FFT, which is done orthogonally to the fringe direction. For the general case, were neither $\theta_x$ or $\theta_y$ are equal to zero, a diagonal re-sampling is required.

Figure 6A:
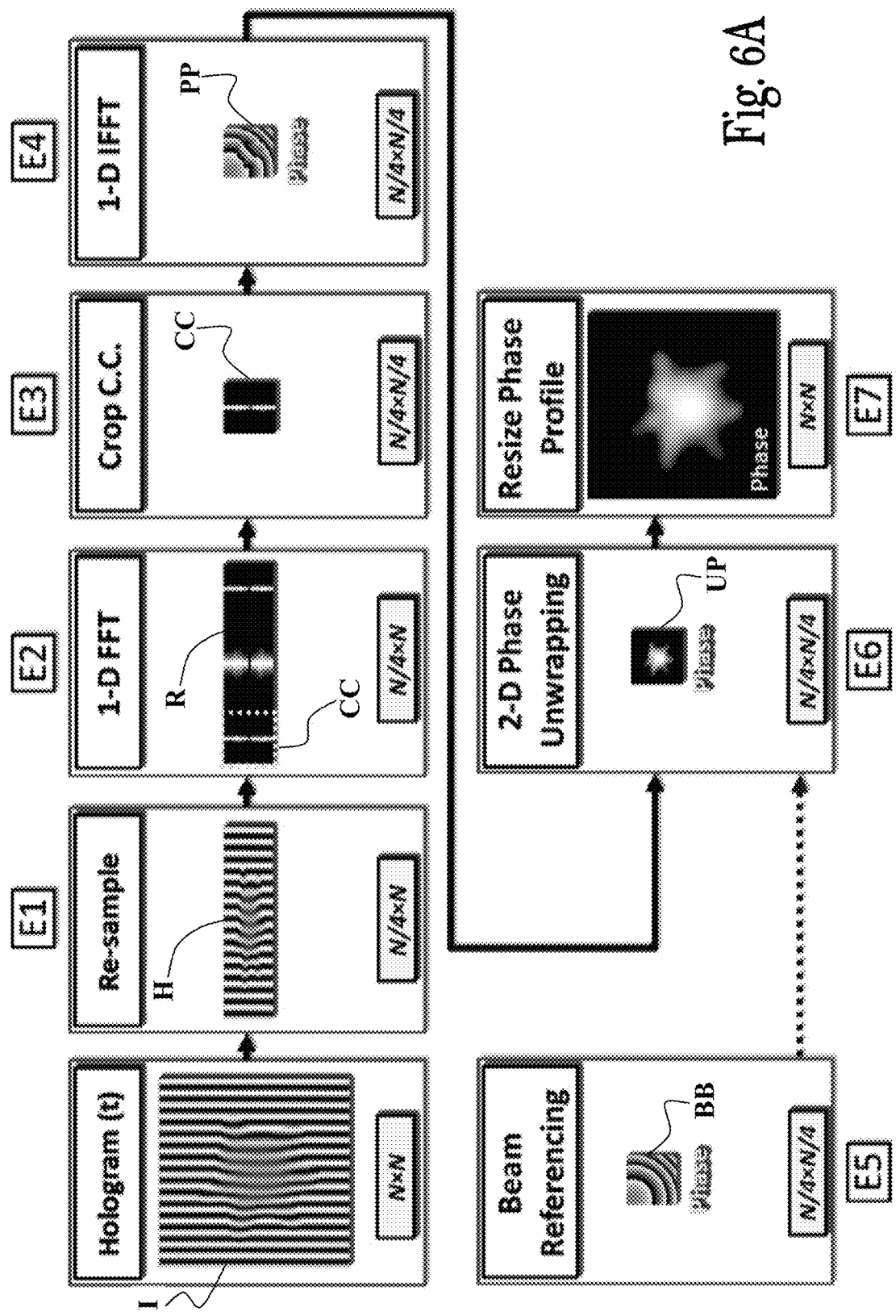
FIGS. 6A and 6B schematically illustrate improved phase extraction techniques for off-axis interferograms according to some possible embodiments utilizing re-sampling the sample interferograms (also referred to herein as processes E and F, respectively)
Figure 6B:
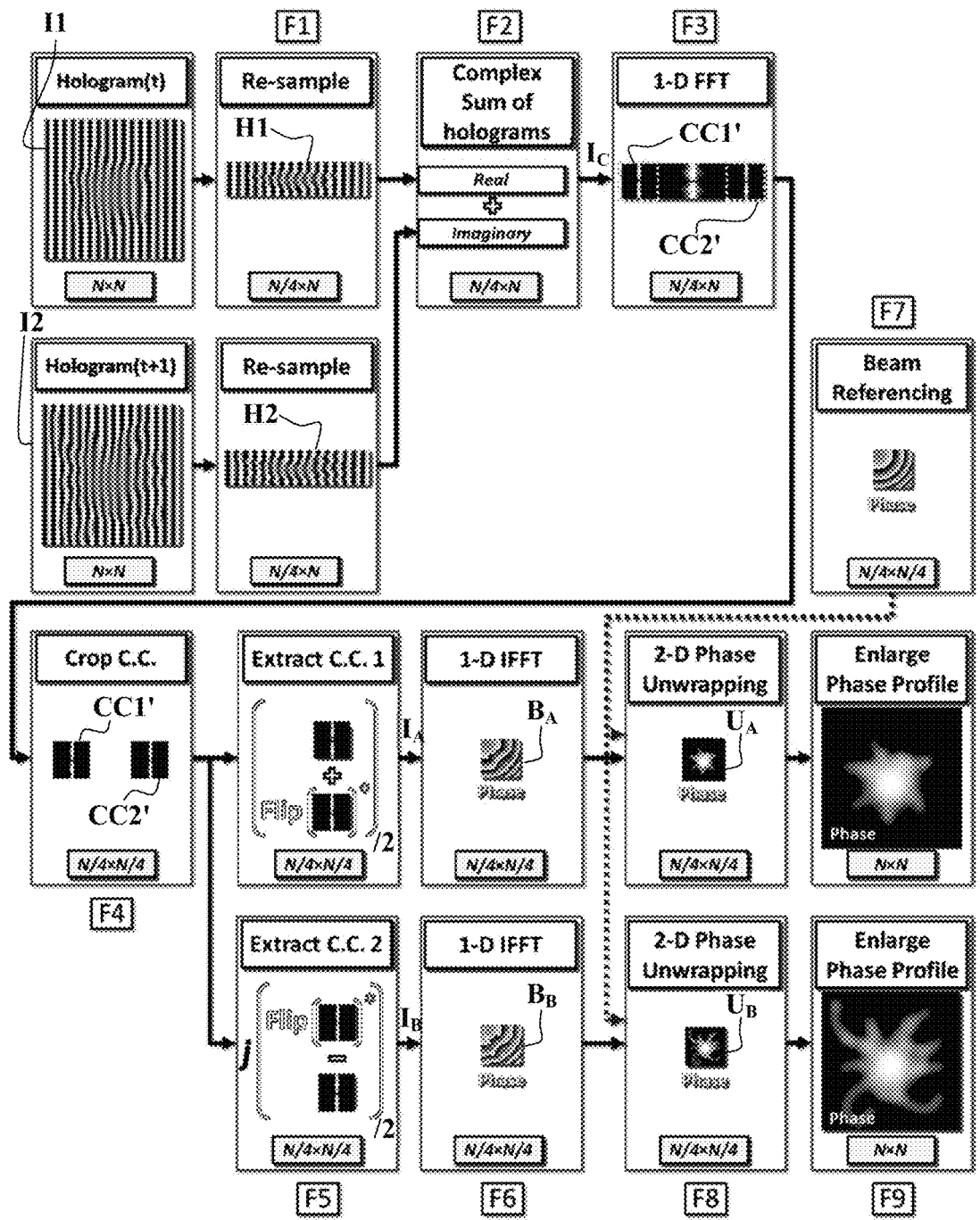

This process phase extraction technique is presented in FIG. 6A, wherein it is assumed that the interference fringes are straight across the vertical axis i.e., $\theta_y=0$, and includes the following steps:

E1. Re-sampling: Re-sample/downsample the N×N digital hologram I along the vertical axis 'y' to create a hologram H with N/4×N pixels.

E2. 1D FFT: Transform the digital hologram H, containing N/4×N pixels, to the spatial-frequency domain using a 1D FFT across the horizontal axis, resulting in a matrix R containing N/4×N complex pixels i.e., applying the 1D FFT N/4 times to transform each row of H.

E3. Cross-correlation cropping: Similar to step A2 in FIG. 3 (selecting the one N/4×N/4 CC of the matrix R).

E4. 1D IFFT: Convert the N/4×N/4 cross-correlation term CC back to the image domain using a 1D IFFT across the horizontal axis, resulting in an N/4×N/4 complex matrix PP representing the sample wave-front.

E5. Beam referencing: Before conducting the sample interferograms measurements, calculate the N/4×N/4 sample-free wave-front BB by repeating steps E1-E4 described above without the sample 14, and divide the sample wave-front by the sample-free wave-front.

E6. Phase unwrapping: Similar to step B5 in FIG. 3.

E7. Enlarge unwrapped phase profile: Similar to step B6 in FIG. 3.

Further improvement may be achieved by implementing the same analysis of the complex hologram defined in Eqs. (2-4), without using the hologram multiplexing stage. Thus, in this case, multiplexed holograms of Eq. (2) are not used, and the flip operation of Eq. (4) is defined only around the horizontal axis (in the same direction of the 1D FFT). This phase extraction process is presented in FIG. 6B, and includes the following steps:

F1. Re-sampling ×2: Re-sample the two N×N digital holograms $I_1$ and $I_2$ along the vertical axis to create two re-sampled holograms, each having N/4×N pixels, H1 and H2 respectively.

F2. Complex summation: Sum the two re-sampled holograms H1 and H2 to construct a complex matrix where the first hologram H1 is the real part and the second hologram H2 is the imaginary part, to thereby obtain a complex hologram $I_C$ according to Eq. (2) (in this case $I_A$ is the first re-sampled hologram and $I_B$ is the second re-sampled hologram, each of which contains N/4×N pixels).

F3. 1D FFT: Similar to step E2 in FIG. 6A.

F4. Cross-correlation cropping ×2: Crop the two cross-correlation terms, CC1' (selecting the leftmost N/4×N/4 cell of the matrix $I_C$) and CC2' (selecting the rightmost N/4×N/4 cell of the matrix $I_C$), each containing N/4×N/4 pixels.

F5. Cross-correlation extraction ×2: Equation (4) is performed only on the cropped cross-correlation terms with a one directional flipping, which yields the cross-correlation term for $I_A$ and the cross-correlation term for $I_B$.

F6. 1D inverse FFT ×2: Similar to step E4 in FIG. 6A, but for the two extracted cross-correlations $I_A$ and $I_B$, thereby obtaining two complex images $B_A$ and $B_B$, respectively.

F7. Beam referencing ×2: Similar to step E5 in FIG. 6A, but for the two wave-fronts.

F8. Phase unwrapping ×2: Similar to step B5 in FIG. 6A, but for the two phase profiles $B_A$ and $B_B$.

F9. Enlarge unwrapped phase profile ×2: Similar to E7 in FIG. 6A, but for the two phase profiles $U_A$ and $U_B$.

To evaluate the performance of the algorithms, off-axis image holograms were acquired using a portable interferometric module connected to an inverted microscope. The digital processing was done using a conventional personal computer (Intel i7-2600, 3.4 GHz CPU, 8 GB RAM), without using GPU or parallel processing (only a single core was utilized), on Matlab R2012b. The phase unwrapping was carried out using the 2D-SRNCP algorithm.

The first stage in the evaluation of the algorithms included measuring the frame rates with and without phase unwrapping, when processing off-axis holograms of various sizes. The second part of the evaluation included measuring the calculation times of each of the different steps of the algorithms for an off-axis hologram containing one megapixel.

Figure 7A:
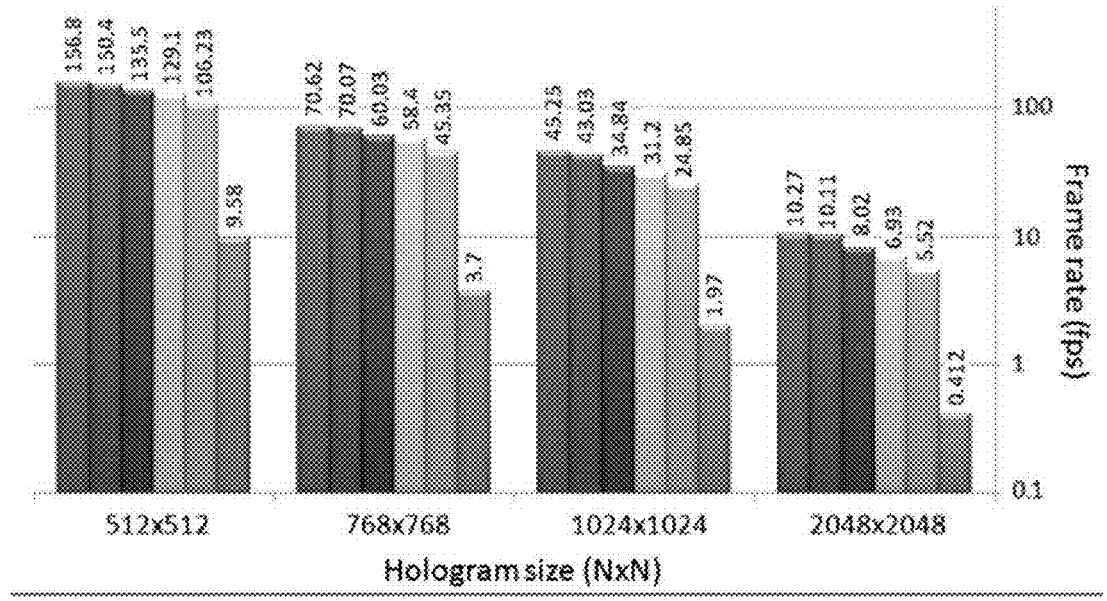
FIGS. 7A and 7B shows a comparison between the frame rates obtained with the various embodiments for various sizes of off-axis interferograms.
Figure 7B:
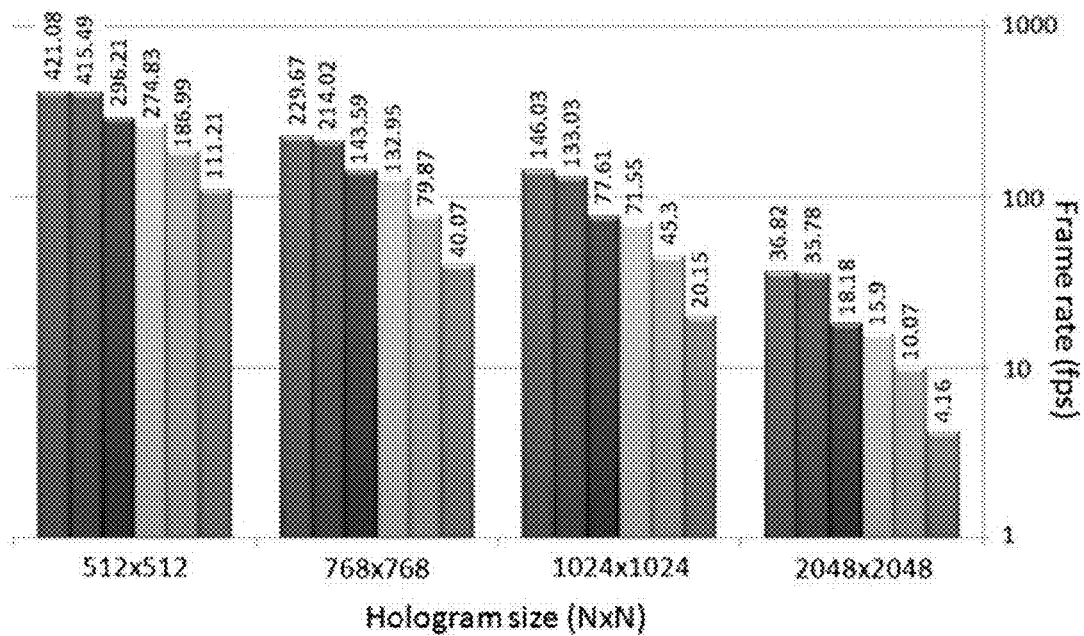

For measuring the frame rates the following five data sets were used of 400 off-axis holograms containing 2048×2048, 1024×1024, 768×768, and 512×512 pixels each. Each evaluated parameter was determined based on an averaged value of five runs of each algorithm and for each data set and parameter. FIGS. 7A and 7B show the frame rates achieved using the different algorithms, per hologram size, with phase unwrapping (FIG. 7A) and without it (FIG. 7B).

Table 1 presents a comparison of the processing times of the different stages in the algorithms for one-megapixel holograms. Compared to the phase processing technique illustrated in FIG. 2, the newly presented phase extraction techniques illustrated in FIGS. 3 to 6 suggest much faster calculation times for the FFT and the IFFT steps. Additional decrease in the calculation time can be seen in the phase unwrapping step, due to the exclusion of the zero-padding step.

TABLE 1

Comparison between the processing times and frame rates of the various algorithms for off-axis holograms containing 1024 × 1024 pixels.

| | | Time [ms] | | | | Frame rate [fps] | |
| | | | | | | With | Without |
| Process | | FFT | IFFT | Unwrap | Others | Total | unwrapping | unwrapping |
|---|---|---|---|---|---|---|---|---|
| Previously presented | A | 13.806 | 13.442 | 457.97 | 22.382 | 507 | 1.97 | 20.15 |
| | B | 14.005 | 1.442 | 17.127 | 7.627 | 40.2 | 24.85 | 45.30 |
| | C | 6.588 | 1.384 | 17.125 | 5.003 | 32.1 | 31.2 | 71.55 |
| Newly presented | D | 2.304 | 1.316 | 15.705 | 9.377 | 28.702 | 34.84 | 77.61 |
| | E | 0.625 | 0.332 | 15.82 | 6.455 | 23.233 | 43.04 | 133.03 |
| | F | 0.416 | 0.332 | 15.774 | 5.578 | 22.1 | 45.25 | 146.03 |

Process D (illustrated in FIG. 5) shows a decrease in the calculation time of the 2-D FFT by a factor of 6, caused by calculating four wave-fronts with a single Fourier transform of a complex hologram composed of two multiplexed holograms, in addition to other FFT-related calculations that are performed here only once. Also seen, a decrease in the inverse 2-D FFT by a factor of 10, due to the smaller calculated matrix (can also be seen by comparing processes B and C shown in FIGS. 3 and 4).

In processes E and F (shown in FIGS. 6A-B), a different approach is applied, where the hologram were re-sampled on one axis, and a 1D FFT was applied on the other axis. This enables to decrease the calculation time by a factor of 22 for process E, and by a factor of 33 for process F. Overall, the use of a 1D FFT caused an additional reduction in the calculation time of the IFFT by a factor of 4 compared to process D, and a by factor of 40.5 compared to process A.

Figure 8A:
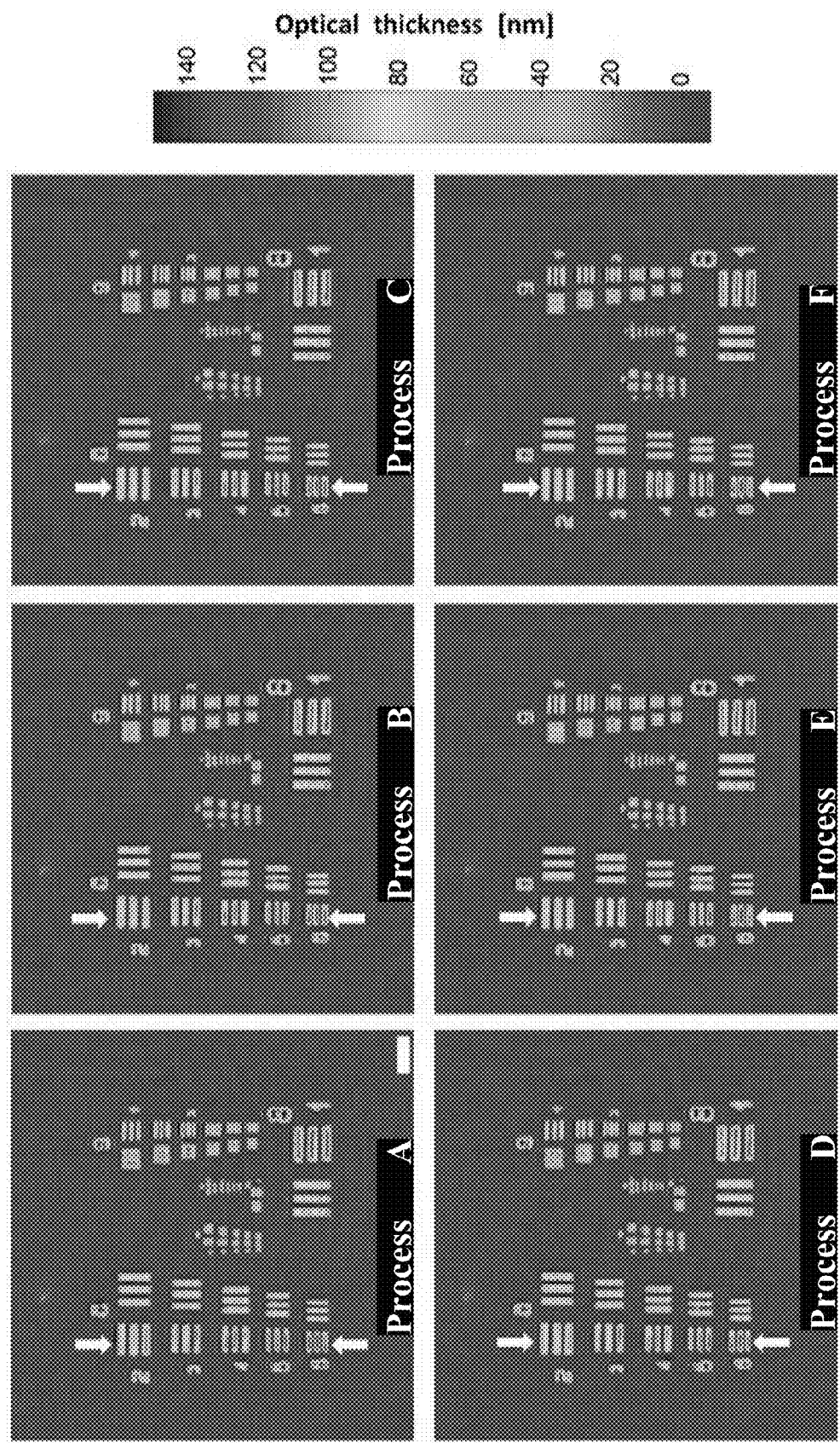
FIGS. 8A and 8B shows comparison of optical thickness maps of the technique exemplified herein.
Figure 8B:
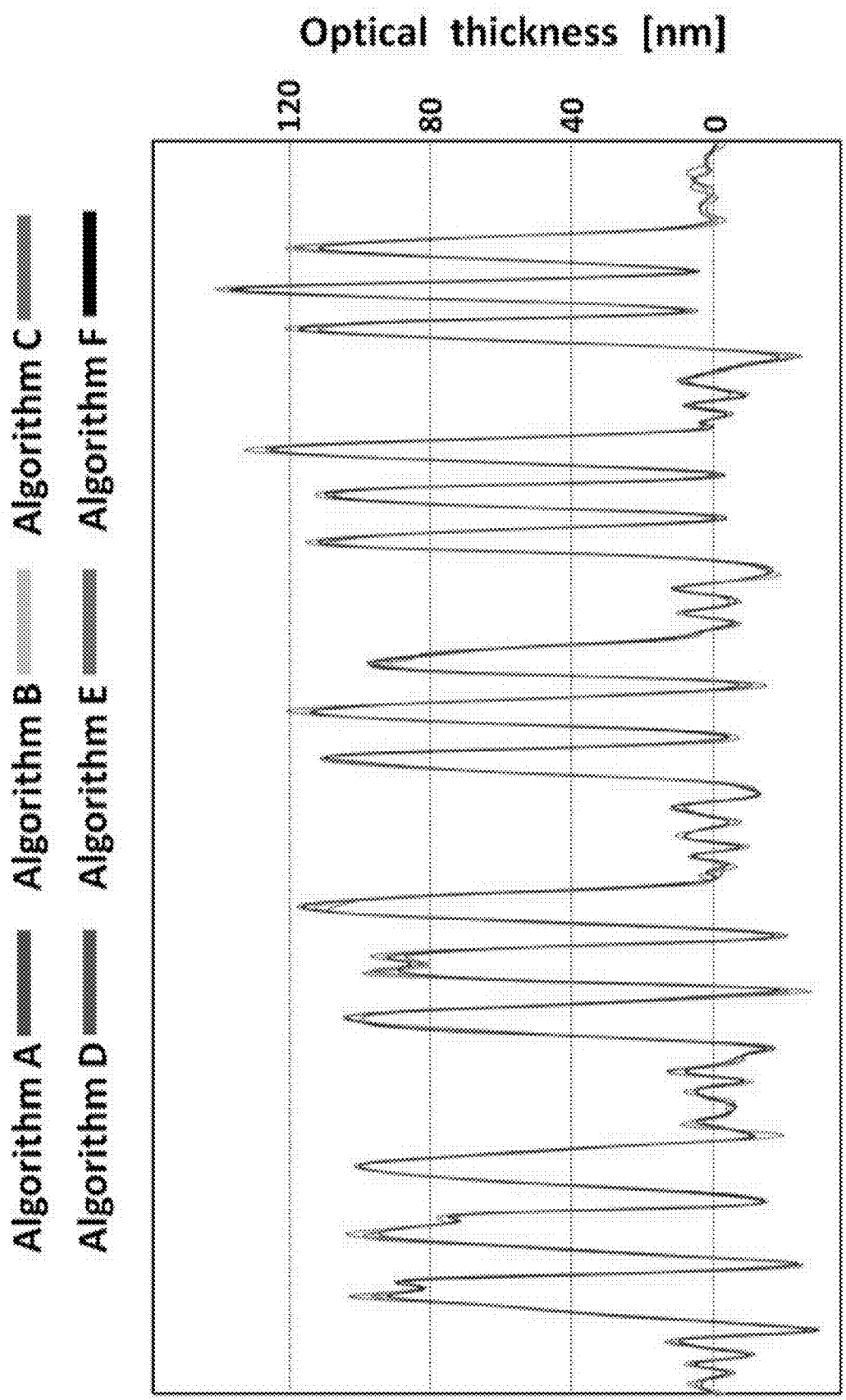

To confirm the quality of the reconstruction for the phase extraction processes A to F, a 1951 USAF phase test target, created by focused ion beam lithography, was measured. The recorded hologram was processed to the optical thickness map using phase extraction processes A to F. The results illustrated in FIG. 8A show that all the phase processing processes (A to F) show similar results, with the same reconstructed resolution limit of 0.69 μm (group 9, element 4 in the USAF test target). This experimental resolution limit corresponds to the calculated resolution limit of the imaging system of 0.7 μm. FIG. 8B shows cross-sections across the optical thickness maps at group 8, between the points indicated by the white arrows in FIG. 8A, for all reconstructions. As seen, the phase extraction processes provide similar results, with minor artifacts, smaller than the point spread function of the imaging system, which are related to numerical noise.

The high frame rates provided by the new algorithms enable additional in-process calculations, while still maintaining video frame rate for visualization of the unwrapped phase maps. To demonstrate this, the IPM setup was used to image RBC samples. 500 off-axis holograms were acquired containing 1024×1024 pixels and 1024×2048 pixels, at recording frame rates of 31 fps and 15 fps respectively.

Then, phase extraction F was applied for the extraction of the unwrapped phase maps of the sample. Since for RBCs, the refractive index can be considered as homogenous, the physical thickness map h(x,y;t) of the sample can be derived from the time-dependent optical thickness map OPD(x,y;t) by dividing it by $\Delta_{n=0.065}$.

During this physical thickness map calculation process, an additional calculation was integrated for the temporal fluctuations in the thickness map, which is associated with the root mean square (RMS) membrane displacement of the RBCs, a parameter that was previously shown useful for characterizing blood-related diseases, and is defined as follows:

$$\Delta h_{RMS}(x,y) = \sqrt{\langle (h(x,y;t) - \langle h(x,y;t)\rangle_t)^2 \rangle_t}, \quad (5)$$

where h(x,y;t) is the physical thickness map of the sample at time point t, and $\langle \bullet \rangle_t$ is the temporal average for each pixel (x,y). Thus, to calculate the RMS membrane displacement map $\Delta h_{RMS}(x,y)$= for each spatial point (x,y) on the thickness map, a temporal vector of points is needed. For this aim, during the run of phase extraction process F, between steps F8 and F9, a stack was integrated to store up to 24 temporal frames, which change over time in a 'first in-first out' (FIFO) stack manner. Finally, the calculated RMS membrane displacement map should be pushed into step F9 for enlargement and presentation.

Figure 9A:
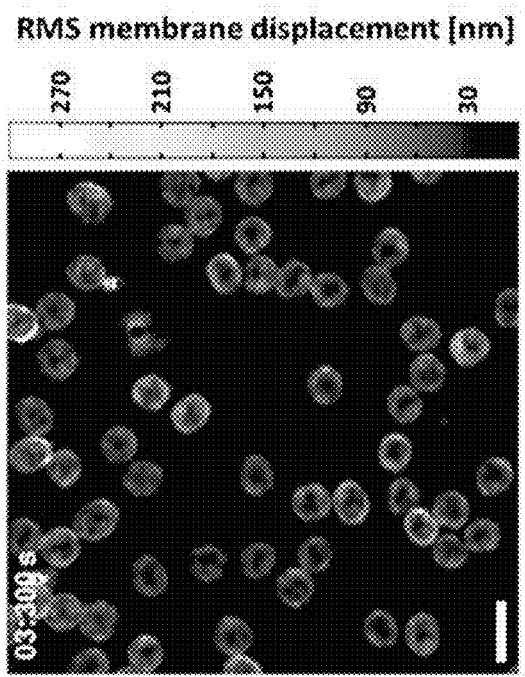
FIGS. 9A to 9C shows results obtained using phase extraction techniques according to possible embodiments.
Figure 9B:
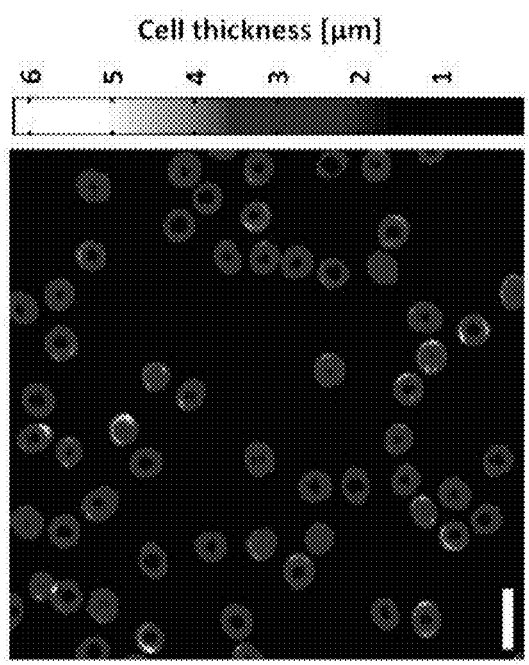

FIG. 9A shows one frame from this thickness map sequence. FIG. 9B shows the resulting RMS membrane displacement map of the RBCs, containing 1024×1024 pixels. Using this approach, processing frame rate of 31 fps were obtained (and presented at a frame rate of 25 fps due to visualization time consumption). This is believed to be the first time where the RMS membrane displacement map is calculated dynamically at real time. This map reveals interesting information about the dynamics of the fluctuations of the RBCs. It is noted that the fluctuations amplitude create wave-like pattern, which either rotates around the RBC or is localized on a small area on the cell surface.

Figure 9C:
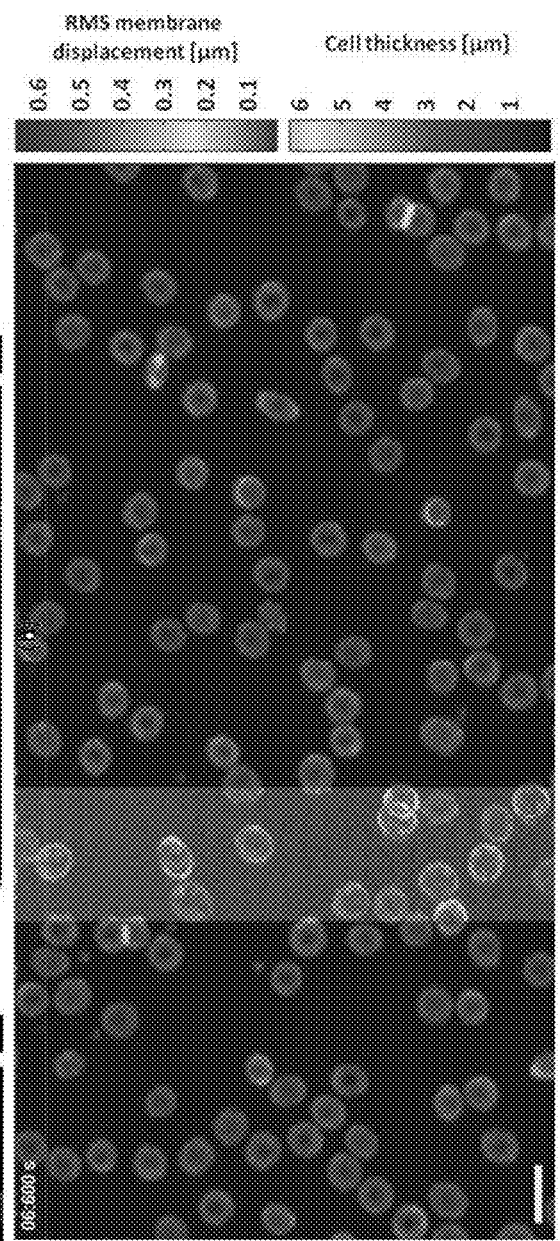

In a second demonstration, the off-axis holograms processed were double in size compared to the ones used in the first demonstration. This time, the calculation of the RMS membrane displacement map was integrated for a 1024×256-pixel window, shifted across the field of view, during the visualization for the thickness map, containing 1024×2048 pixels. The obtained results are shown in FIG. 9C. The overall processing frame rate was 22 fps without the fluctuation-map calculation, and 15 fps with the fluctuation-map calculation. It is believed that this new technique will find perspective uses for real-time cell diagnosis and sorting.

The present invention provides new and efficient algorithms for quantitative phase map reconstruction, reaching processing frame rates of up to 45 fps for one megapixel off-axis holograms when the unwrapped phase map is needed, and processing frame rates of up to 150 fps when phase unwrapping is not required, using a single-core processing unit on a standard personal computer. This was done by increasing the efficiency of the Fourier transform steps in the conventional algorithm. It was demonstrated that since the phase map reconstruction time can exceed video frame rate, additional sample-related parameters could be calculated, while still maintaining video frame rate.

In general, reaching higher frame rates allows using larger camera sensors, which contain more pixels, for real-time quantitative imaging. The disclosure hereof presented that for two megapixel holograms, it is possible to reach near video frame rate, while using phase unwrapping. In addition, it was demonstrated that even four-megapixel holograms can still be reconstructed with reasonable frame rate of 10 fps when using phase unwrapping, or 36 fps without phase unwrapping. This presents a new standard for performance and enables imaging significantly larger areas on the samples in real time, on standard personal computers.

After comparing the performances of the various phase extraction process, it rapid processing was demonstrated in reconstructing the quantitative unwrapped phase and thickness maps of RBC samples, and simultaneous inline calculation of the dynamic RMS membrane displacement map of the RBCs. This parameter was previously shown as a useful tool for characterization of blood-related diseases, and the ability to visualize it in real time provides a new tool for fast analysis and diagnosis on a higher number of cells together.

It should be therefore appreciated that embodiments of the present invention may be used to implement software products that can extract the optical thickness profile, acquired by off-axis interferometric imaging devices, in significantly higher frame rates. In embodiments where the invention is implemented using software, the software can be stored in a computer program product and loaded into a computer system using a removable storage drive/media, removable memory chips or a communications interface. The control logic (software), when executed by a control processor, causes the control processor to perform certain functions of the invention as described herein.

In other embodiments, features of the invention are implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet other embodiments, features of the invention can be implemented using a combination of both hardware and software.

Such software and/or hardware embodiments of the invention may be advantageously used by medical doctors and clinicians, biologists, optical technician (e.g., elements testing for mass production), metrology users, and other microscope\imaging users (e.g., for wafer inspection). Embodiments of the present invention may be also used for cell analysis, monitoring motion and flow of cells, for sample collection, navigation during imaging, lithography inspection, PCB evaluation, and the like.

As described hereinabove and shown in the associated figures, the present invention provides improved interferograms phase extraction processes. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the invention.

The invention claimed is:

1. A computer-implemented method of rapidly extracting phase data of off-axis interferogram images, the method comprising:
   providing image data from an optical setup configured to generate said image data comprising at least two of the interferogram images associated with a sample;
   providing at least one processor and memory configured to execute instructions for carrying out the method, as follows:
   generating a combined interferogram image by combining said at least two interferogram images, said combining configured to use empty spatial-frequency domain areas, and guarantee separation between auto-correlation and cross-correlation spatial-frequency domain terms, of the generated combined interferogram image, by at least one of multiplexing and complex summation, said multiplexing comprising image rotation and superimposition and in said complex summation at least one of said at least two interferogram images is used in a real part of said complex summation and at least another one of said at least two interferogram images is used in an imaginary part of said complex summation;
   performing spectral decomposition to said combined interferogram image to obtain within a single spectral decomposition operation of said combined interferogram image a set of frequency components of said at least two interferogram images;
   generating from a respective at least two portions of said set of frequency components respective at least two complex images, each of said respective at least two complex images being indicative of phase data of at least one of said at least two interferogram images and being of a substantially reduced size with respect to the respective interferogram image; and
   processing said respective at least two complex images having said substantially reduced size and rapidly generating therefrom respective phase images.

2. The method of claim 1, wherein the performing of the spectral decomposition comprises applying a single Fourier transform operation to the combined interferogram image.

3. The method of claim 1, wherein the processing of the respective at least two complex images comprises applying an inverse Fourier transform to each of said at least two complex images having the substantially reduced size.

4. The method of claim 1, wherein a dimension of the respective at least two complex images is about a quarter of a dimension of each the at least two interferogram images.

5. The method of claim 1, wherein each one of the respective at least two portions of the frequency components is indicative of a respective cross-correlation of an interference pattern in a respective one of the at least two interferogram images.

6. The method of claim 1, wherein the image data from the optical setup comprises a sample-free interferogram image, performing spectral decomposition to said sample-free image to obtain a set of sample-free frequency components therefrom, generating from a portion of said set of sample-free frequency components a sample-free complex reference image, and wherein the processing of the respective at least two complex images comprising using said sample-free complex reference image to apply phase unwrapping to the respective at least two complex images having the substantially reduced size.

7. The method of claim 1, wherein the processing of the respective at least two complex images having the substantially reduced size comprising at least one of phase unwrapping to generate the phase images, and enlarging a size of the phase images.

8. The method of claim 1, wherein the generating of the combined image comprising applying asymmetric re-sampling to two of the at least two interferogram images along an image plane axis of each of said two interferogram images, to thereby reduce size of each of the two interferogram images along said image plane axis, and wherein the combining of said re-sampled interferogram images is carried out by complex summation using a first one of said re-sampled interferogram images as real part of the combined interferogram image and a second one of said re-sampled interferogram images as an imaginary part of said combined interferogram image.

9. The method of claim 8, wherein performing of the spectral decomposition comprises using a one dimensional Fourier transform operation to obtain the frequency components.

10. The method of claim 1, wherein the generating of the combined interferogram image comprises summating a first one of said at least two interferogram images with a transpose of a second one of said at least two interferogram images.

11. The method of claim 8, wherein the processing of the two complex images having the substantially reduced size comprising asymmetric re-sampling to substantially restore the size of the two interferogram images along the respective image plane axis of said images.

12. The method of claim 8, wherein the generating of the complex images having the substantially reduced size comprises selecting a first spatial-frequency portion of the frequency components and generating therefrom a first complex image, and selecting a second spatial-frequency portion of the frequency components and generating therefrom a second complex image.

13. The method of claim 1, wherein the generating of the combined interferogram image comprises generating a complex interferogram image constructed from first and second ones of said at least two interferogram images used as real and imaginary parts of said complex interferogram image.

14. The method of claim 13, comprising asymmetric re-sampling of the first and second interferogram images along an image plane axis to reduce sizes of said interferogram images along said image plane axis.

15. The method of claim 1, wherein the generating of the respective at least two complex images having the substantially reduced size comprises selecting first and second spatial-frequency portions of the frequency components, generating by a first linear combination of said first and second spatial-frequency portions a first complex image and by a second linear combination of said first and second spatial-frequency portions a second complex image, said first and second linear combinations comprise transposition and conjugation of one of said first and second spatial-frequency portions.

16. The method of claim 15, wherein the transposition and conjugation is respectively applied in the first and second linear combinations to a different one of the selected first and second spatial-frequency portions of the frequency components.

17. The method of claim 1, wherein the generating of the combined interferogram image comprising generating a complex interferogram image constructed from first, second, third and fourth, of the at least two interferogram images, using for the real part of said complex interferogram image superimposition of the first interferogram image with a transpose of the second interferogram image, and for the imaginary part of said complex interferogram image superimposition of said third interferogram image with a transpose of said fourth interferogram image.

18. The method of claim 17, wherein the generating of the respective at least two complex images having the substantially reduced size comprises: selecting first and second spatial-frequency portions of the frequency components, generating by a first linear combination of said first and second spatial-frequency portions a first complex image and by a second linear combination of said first and second spatial-frequency portions a second complex image; and selecting third and fourth spatial-frequency portions of the frequency components, generating by said first linear combination of said third and fourth spatial-frequency portions a third complex image and by said second linear combination of said third and fourth spatial-frequency portions a fourth complex image, each of said first and second linear combinations comprise transposition and conjugation of one of the spatial-frequency portions.

19. The method of claim 18, wherein the transposition and conjugation is respectively applied in the first and second linear combinations to a different one of the spatial-frequency portions.

20. The method of claim 19, wherein the first and second spatial-frequency portions of the frequency components are associated with a first image plane axis, and wherein the third and fourth spatial-frequency portions of the frequency components are associated with a second image plane axis, and wherein said first and second image plane axes are orthogonal.

21. The method of claim 1, comprising consecutively acquiring in real time the at least two interferogram images by the optical setup, and generating in real time a video stream from the respectively generated phase images.

22. A non-transitory computer readable medium storing instructions that when executed by a processor causes said processor to perform the method of claim 1.

23. A system for rapidly processing off-axis interferogram images, said system comprising at least one processing unit and one or more computer-readable media storing computer executable modules executed by said at least one processing unit, said computer executable modules comprising:
 an input module configured to receive at least two interferogram images generated using an optical setup configured to generate said at least two of the interferogram images with association with a sample;
 an image generation module configured to generate a combined interferogram image for exploiting empty spatial-frequency domain areas, and ensure separation between auto-correlation and cross-correlation spatial-frequency domain terms, of the generated combined interferogram image, by combining said at least two interferogram images by at least one of multiplexing and complex summation, said multiplexing comprising image rotation and superimposition and in said complex summation at least one of said at least two interferogram images is used in a real part of said complex summation and at least another one of said at least two interferogram images is used in an imaginary part of said complex summation;

a transformation module configured to decompose said combined interferogram image within a single spectral decomposition operation of said combined interferogram image and generate spectra data of said at least two interferogram images;

a cropper module configured to crop respective at least two portions of said spectra data, each of said at least two portions having a substantially reduced size with respect to the respective interferogram image;

an inverse transformation module configured to generate from the at least two cropped spectra data portions having the substantially reduced size respective at least two complex images having the substantially reduced size and being indicative of phase data of said at least two interferogram images; and a phase unwrap module configured to rapidly unwrap phase image of said respective at least two complex images having the substantially reduced size and generate respective phase images therefrom.

24. The system of claim 23, comprising an up-sampler module configured to enlarge size of at least one of the respective phase images.

25. The system of claim 23, configured to use the transformation module, the cropper module and the inverse transformation module, to generate at least one sample-free interferogram image and generate therefrom at least one sample-free complex image for use by the phase unwrap module.

26. The system of claim 23, comprising a down-sampler module configured to reduce a size of at least one of the at least two interferogram images.

27. The system of claim 26, wherein the transformation module is configured to perform one-dimensional data transformations.

28. The system of claim 23, wherein the image generator module comprising a transposition module configured to generate a transposed interferogram image of at least one of the at least two interferogram images, and a superimposition module configured to generate the combined interferogram image as a superimposition interferogram image of another one of said at least two interferogram images and said transposed interferogram image.

29. The system of claim 28, wherein:
the cropper module comprises first and second cropper modules and a transposition module, said first and second cropper modules configured to crop respective first and second spatial-frequency portions of the spectra data, and said transposition module configured to transpose one of said respective first and second spatial-frequency portions,
the inverse transformation module comprises first and second inverse transformation modules for respectively applying an inverse transformation to the spatial-frequency portion transposed by said transposition module and to the spatial-frequency portion not transposed by said transposition module.

30. The system of claim 23, comprising a down-sampler module configured to reduce a size of the at least two interferogram images.

31. The system of claim 23, comprising first and second image constructor modules, each of said image constructor modules comprises:
the cropper module comprises first and second cropper modules configured to crop first and second portions of the spectra data, respectively;
said first and second image constructor modules are respectively configured to generate from a first linear combination of said first and second spatial-frequency portions a first spectral domain image and from a second linear combination of said first and second spatial-frequency portions a second spectral domain image, said first and second linear combinations comprise a transposition of one of said first and second spatial-frequency portions;
the inverse transformation module comprises first and second inverse transformation modules configured to respectively generate from said first and second spectral domain images first and second complex images; and
first and second phase un-wrap modules configured to respectively unwrap phase data of said first and second complex images.

32. The system of claim 23, wherein the image generator module configured to generate the combined interferogram image from first, second, third and fourth, interferogram images of the at least two interferogram images, said image generator module comprising first and second transposition modules for generating respective transposed second and fourth interferogram images from said second and fourth interferogram images, a first superimposition module configured to generated a first superimposed image from said first interferogram image and said transposed second interferogram image, a second superimposition module configured to generated a second superimposed image from said third interferogram image and said transposed fourth interferogram image, and a summation module configured to construct the combined image as a complex interferogram image using said first and second superimposed images as real and imaginary parts, respectively.

33. The system of claim 32, wherein
the cropper module comprises first, second, third and fourth, cropper module, configured to crop respective first, second, third and fourth, spatial-frequency portions of the sample-related spectra data, said first and second spatial-frequency portions being associated with a first image plane axis, and said third and fourth spatial-frequency portions being associated with a second image plane axis;
said system comprising: first, second, third and fourth, transposition and conjugation modules for generating respective first, second, third and fourth, transposed and conjugated interferogram images of said first, second, third and fourth, spatial-frequency portions; a first image constructor module configured to generate by a first linear combination of said first spatial-frequency portion and said transposed and conjugated second spatial-frequency portion a first spectral domain image; a second image constructor module configured to generate by a second linear combination of said transposed and conjugated first spatial-frequency portion and said second spatial-frequency portion a second spectral domain image; a third image constructor module configured to generate by the first linear combination of said third spatial-frequency portion and said transposed and conjugated fourth spatial-frequency portion a third spectral domain image; a fourth image constructor module configured to generate by the second linear combination of said transposed and conjugated third spatial-frequency portion and said fourth spatial-frequency portion a fourth spectral domain image;
the inverse transformation module comprises first, second, third and fourth, inverse transformation modules configured to respectively generate from said first, second, third and fourth, spectral domain images first, second, third and fourth, complex images; and said system comprising first, second, third and fourth, phase un-wrap module configured to unwrap phase data of said first, second, third and fourth, complex images.

34. A system for generating a stream of images from phase data extracted from a stream of interferogram images, the system comprising at least one processing unit and one or more computer-readable media storing computer executable modules executed by said at least one processing unit, said computer executable modules, comprising:

an input module configured to receive said stream of interferogram images, at least some of said interferogram images are associated with a sample;

an image generation module configured to generate a combined interferogram image for exploiting empty spatial-frequency domain areas, and ensure separation between auto-correlation and cross-correlation spatial-frequency domain terms, of the generated combined interferogram image, by combining at least two of said interferogram images by at least one of multiplexing and complex summation, said multiplexing comprising image rotation and superimposition and in said complex summation at least one of said at least two interferogram images is used in a real part of said complex summation and at least another one of said at least two interferogram images is used in an imaginary part of said complex summation;

a transformation module configured to decompose said combined interferogram image within a single spectral decomposition operation of said combined interferogram image and generate spatial spectra data of said at least two interferogram images;

a cropper module configured to crop respective at least two portions of said spectra data, each of said at least two portions having a substantially reduced size with respect to the respective interferogram image;

an inverse transformation module configured to generate from the at least two cropped spectra data portions having the substantially reduced size respective at least two complex images having the substantially reduced size and being indicative of phase data of said at least two interferogram images; and a phase unwrap module configured to rapidly generate a stream of phase images from said at least two complex images having said substantial reduced size.

35. The system of claim 34, wherein the image generation module is configured to generate the combined image as a multiplexed interferogram image from two of said interferogram images, by rotating one of said interferogram images and superimposing the other interferogram image with the rotated interferogram image.

36. The system of claim 35, wherein the cropper module is configured to crop respective two portions of the spectra data obtained from the transformation module.

37. The system of claim 35, wherein the image generation module is configured to generate the combined image as a combined complex interferogram image by generating from a first pair of said stream of interferogram images a multiplexed interferogram image used as a real part of said combined complex interferogram image, and generating from another pair of said stream of interferogram images a multiplexed interferogram image used as an imaginary part of said combined complex interferogram image.

38. The system of claim 37, wherein the cropper module is configured to crop four portions of the spatial spectra data obtained from the transformation module, each of said cropped four portions of the spectra data being indicative of phase data at least one of the interferogram images used to generate the combined complex interferogram image.

* * * * *